US011904447B2

(12) United States Patent
Baba et al.

(10) Patent No.: US 11,904,447 B2
(45) Date of Patent: Feb. 20, 2024

(54) DRIVING TOOL

(71) Applicant: MAKITA CORPORATION, Anjo (JP)

(72) Inventors: Norikazu Baba, Anjo (JP); Shun Kuriki, Anjo (JP); Kiyonobu Yoshikane, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 17/946,512

(22) Filed: Sep. 16, 2022

(65) Prior Publication Data

US 2023/0126083 A1 Apr. 27, 2023

(30) Foreign Application Priority Data

Oct. 26, 2021 (JP) ................................ 2021-174428

(51) Int. Cl.

*B25C 1/04* (2006.01)
*B25C 1/06* (2006.01)
*B25D 9/04* (2006.01)

(52) U.S. Cl.

CPC ................ *B25C 1/047* (2013.01); *B25D 9/04* (2013.01); *B25C 1/06* (2013.01); *B25D 2250/381* (2013.01)

(58) Field of Classification Search

CPC .......... B25C 1/04; B25C 1/041; B25C 1/043; B25C 1/047; B25C 1/06; B25C 1/008; B25D 9/04; B25D 2250/381

See application file for complete search history.

(56) References Cited

U.S. PATENT DOCUMENTS

2021/0101272 A1* 4/2021 Saitou .................... B25D 16/00
2021/0138623 A1* 5/2021 Bierdeman ............... B25C 1/06
2021/0308852 A1* 10/2021 Ueda ....................... B25C 1/047

FOREIGN PATENT DOCUMENTS

JP 6915682 B2 8/2021
WO 2020/059666 A1 3/2020

* cited by examiner

*Primary Examiner* — Veronica Martin
(74) *Attorney, Agent, or Firm* — Oliff PLC

(57) ABSTRACT

A driving tool includes a piston, a driver, and a lift mechanism. The piston moves in a driving direction by a pressure of a gas. The driver extends from the piston and includes a plurality of engaged portions. The lift mechanism moves the driver in a direction opposite to the driving direction. The lift mechanism includes a rotation shaft, a wheel, a plurality of engaging portions, and a supporting member. The wheel rotates integrally with the rotation shaft. Each of the plurality of engaging portions may engage an engaged portion. The supporting member supports the wheel so the wheel is allowed to move between an initial position and an eccentric position in a radial direction of the rotation shaft.

15 Claims, 12 Drawing Sheets

DRIVING TOOL

CROSS-REFERENCE TO RELATED APPLICATIONS

This application claims priority to Japanese patent application serial number 2021-174428, filed on Oct. 26, 2021, the contents of which are incorporated herein by reference in their entirety for all purposes.

BACKGROUND

The present disclosure generally relates to a driving tool for driving a driving member, such as a nail or a staple, into a wooden material, etc.

A gas-spring type driving tool that utilizes a pressure of a compressed gas as a thrust power for driving a driving member are generally known. A gas-spring type driving tool may include a piston that moves in an up-down direction within a cylinder and a driver that is integrally connected to the piston. The piston and the driver may move downward in a driving direction due to a pressure of the gas filled in an accumulation chamber. The driver may drive the driving member, which is located below in a downward direction. The driving member may be ejected from the driving tool and driven to a workpiece. The piston and the driver may return in a direction opposite to the driving direction by a lift mechanism. This may be done after the driving member has been ejected.

The driver may include a plurality of engaged portions (e.g., rack teeth) arranged in an up-down direction. The lift mechanism may include a wheel that includes a plurality of engaging portions, each of which engages a corresponding engaged portion of the driver. The plurality of engaging portions may be arranged along an outer periphery of the wheel. The wheel may be rotated by an electric motor. After a driving operation has been completed, each of the plurality of the engaging portions may successively engage a corresponding engaged portion of the driver due to rotation of the wheel. Because of this configuration, the driver and the piston may move in a direction opposite to the driving direction. By an upward movement of the piston in the direction opposite to the driving direction, the gas pressure in the accumulation chamber may increase. After the driver has reached to an upper end position, an engagement state of the engaging portion of the lift mechanism with respect to the engaged portion of the driver may be released. Because of this configuration, a driving operation of the driver may be performed again.

The engaging portions of the lift mechanism may receive a large external force from the engaged portions of the driver when the engaging portions move the driver upwards against the gas pressure of the accumulation chamber. Accordingly, it may be desirable that the engaging portions properly engage the engaged portions to move the driver upward, especially while the engaging portions reliably receive the external load.

However, there may be some situations where the engaging portions interfere with the engaged portions, such that they do not properly engage each other. This may cause an upward movement of the driver to stop. For example, when the driving member is driven into a hard wooden material or mistakenly driven into a steel plate, etc., the driving member that was attempted to be driven by the driver may sometimes become deformed within a driving passage, thereby causing a nail jam. Furthermore, there may be some situations where the driving member is not sufficiently driven into a workpiece by a predetermined depth. In these situations, the driver may be stopped at a position above a lower end position. When the driver stops at a position other than its normal position, the wheel of the lift mechanism may still try to rotate in the same manner as in a case where the lift mechanism operates properly. Because of this configuration, the engaging portions may not properly engage corresponding engaged portions, thereby causing the engaging portions to interfere with, for example, a bottom part of the engaged portions.

In the past, there typically has not been a method for smoothly returning the driver to a normal operable state if the engaging portions interfere with, for example, the bottom part of the engaged portions. Additionally, there have been no countermeasures if the driver stops at a position other than its normal position.

SUMMARY

Thus, there is a need for a lift mechanism that can be successively and stably operated both in the event that the driver happens to be stopped at a position other than the normal position as well as when the driver is normally driven.

According to one feature of the present disclosure, a driving tool comprises a piston configured to move in a driving direction by a pressure of a gas The driving tool also includes a driver configured to extend from the piston in the driving direction, the driver comprising a plurality of engaged portions each arranged along the driving direction. The driving tool also comprises a lift mechanism configured to move the driver in a direction opposite to the driving direction. The lift mechanism comprises a rotation shaft, and a wheel configured to rotate integrally with the rotation shaft. The lift mechanism also comprises a plurality of engaging portions arranged along an outer periphery of the wheel, each of the plurality of engaging portions being configured to engage a corresponding engaged portion. The lift mechanism also comprises a supporting member that is formed as part of the rotation shaft and that is configured to support the wheel so the wheel is movable between an initial position and an eccentric position in a radial direction of the rotation shaft. Furthermore, when the driver moves in the direction opposite to the driving direction, the wheel is at a first state or at a second state. In the first state, the wheel engages the driver at the initial position and is movable toward the eccentric position. In the second state, the wheel engages the driver at the eccentric position.

Because of this configuration, when a returning operation of the driver is performed normally and properly, the wheel is at the initial position or at the eccentric position according to a rotation angle of the wheel. In either case where the wheel is at the initial position or at the eccentric position, one of the engaging portions of the lift mechanism can engage a corresponding engaged portion of the driver. Accordingly, an upward returning operation of the driver can continue properly and satisfactorily despite the position of the wheel. In contrast to the above normal case, there may be a case where a nail jamming occurs when a driving operation is performed, which causes the driver to stop at unspecified position. In this case, the engaging portion may not properly engage a corresponding engaged portion, thereby causing interference therebetween. In such a case, the wheel can move (retreat) from the initial position toward the eccentric position. As a result, the interference of the engaging portion with the engaged portion can be accommodated for. After the interference of the engaging portion with the engaged portion has been accommodated for, the wheel can move to the initial position or the eccentric position such that the engaging portion can engage another one of the engaged portion. As a result, an upward returning operation of the driver can be performed successively.

DETAILED DESCRIPTION

Figure 1:
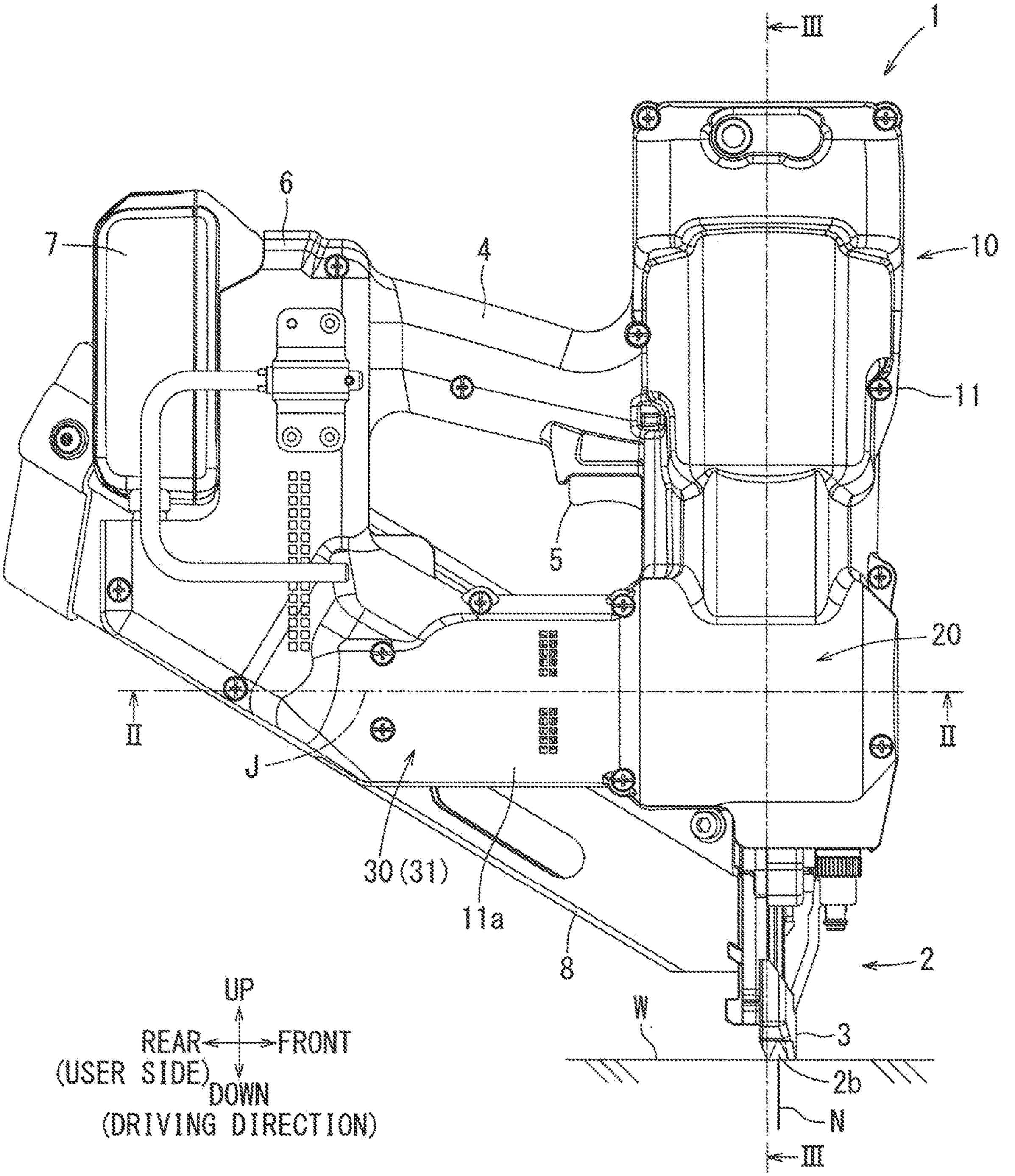
FIG. 1 is a side view of a driving tool.

The detailed description set forth below, when considered with the appended drawings, is intended to be a description of exemplary embodiments of the present disclosure and is not intended to be restrictive and/or representative of the only embodiments in which the present disclosure can be practiced. The term “exemplary” used throughout this description means “serving as an example, instance, or illustration,” and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to a feature of the present disclosure, the driving tool further comprises a biasing member that biases the wheel from the eccentric position toward the initial position. Because of this configuration, in a case where the engaging portion does not normally engage the engaged portion and instead causes an interference with the engaged portion, the wheel can move from the initial position toward the eccentric position. After the interference of the engaging portion with the engaged portion has been accommodated for, the wheel can move (return) to the initial position smoothly. Thus, the engaging portion can still engage one of the engaged portions. As a result, successive returning operations of the driver can be smoothly and quickly performed.

According to another feature of the present disclosure, the supporting member is configured to support the wheel so as to linearly move the wheel with respect to the rotation shaft between the initial position and the eccentric position. The wheel is freely movable in a direction apart from the driver only when the wheel is within a predetermined rotation angle range. Accordingly, when the wheel is within the predetermined rotation angle range, the interference of the engaging portion with the engaged portion can be accommodated for. In contrast, when the wheel is outside of the predetermined rotation angle range, the wheel cannot freely move apart from the driver. In this case, the engaging portion can be prevented from moving (retreating) apart from the engaged portion. As a result, a returning operation of the driver can be performed successively.

According to another feature of the present disclosure, the supporting member includes a pair of supporting surfaces, each of which is parallel to the other and which extends in the radial direction of the rotation shaft. Furthermore, the wheel includes a mounting hole into which the supporting member is inserted. The mounting hole includes a pair of slide surfaces, each of which faces a corresponding supporting surface of the supporting member and which extends in the radial direction of the wheel. Because of this configuration, the wheel can move between the initial position and the eccentric position by utilizing the supporting configuration between the wheel and the rotation shaft. Accordingly, a movement configuration in which the wheel is supported so as to be movable in the radial direction of the rotation shaft can be made compact.

According to another feature of the present disclosure, one of the plurality of engaging portions is a first engaging portion that firstly engages a corresponding engaged portion when the driver moves in the direction opposite to the driving direction. Furthermore, when the wheel is at the initial position, the first engaging portion is disposed on a reference circle having a reference distance from a center of the rotation shaft. Because of this configuration, an arrangement of each engaging portion can be easily designed based on the reference circle, such that a returning operation of the driver can be properly performed successively.

According to another feature of the present disclosure, in a range of 0° to 90° in a forward direction of the rotation of the wheel starting from the first engaging portion, the plurality of engaging portions include at least one outer position engaging portion that is disposed outward of the reference circle in the radial direction of the reference circle. Furthermore, in a range of 90° to 180° in the forward direction of the rotation of the wheel starting from the first engaging portion, the plurality of engaging portions include at least one inner position engaging portion that is disposed inward of the reference circle in the radial direction of the reference circle.

Because of this configuration, when the outer position engaging portion engages one of the engaged portion, the wheel is pushed by the engaged portion. As a result, the wheel moves from the initial position toward the eccentric position. A rotation angle of the wheel is regarded as 0° in a case the first engaging portion starts to engage the engaged portion. The wheel is configured to move from the initial position toward the eccentric position when the rotation angle of the wheel is within 0° to 90°. When the wheel is at the eccentric position at the rotation angle 90° to 180°, the engaged portions engage at the reference circle. Since the inner position engaging portion is arranged inward of the reference circle in the radial direction of the reference circle, the inner position engaging portion engages one of the engaged portion without them interfering with each other. Thus, when the wheel moves from the initial position to the eccentric position or when the wheel remains at the eccentric position, a returning operation of the driver can be smoothly and successively performed.

According to another feature of the present disclosure, in the range of 0° to 90°, the plurality of engaging portions are on the reference circle or outward of the reference circle in the radial direction of the reference circle. Furthermore, in the range of 90° to 180°, the plurality of engaging portions are on the reference circle or inward of the reference circle in the radial direction of the reference circle. A rotation angle of the wheel is regarded as 0° in a case the first engaging portion starts to engage the engaged portion. The wheel moves from the initial position to the eccentric position within the range of 0° to 90°. Furthermore, in the range of 90° to 180°, the wheel remains at the eccentric position and engages the engaged portion without interference being caused between the engaging portions and the engaged portions.

According to another feature of the present disclosure, in a range of 180° to 360° in the forward direction of the rotation of the wheel starting from the first engaging portion, the plurality of engaging portions are on the reference circle. Since the plurality of engaging portions is on the reference circle in the range of 180° to 360°, the plurality of engaging portions can be arranged so as to neither interfere with nor retreat from the engaged portions.

According to another feature of the present disclosure, of two adjacent engaging portions, one is outward of the reference circle in the radial direction of the reference circle and has a first angle with respect to the center of the rotation shaft. Furthermore, the other of the two adjacent engaging portions is inward of the reference circle in the radial direction of the reference circle and has a second angle with respect to the center of the rotation shaft. The second angle is configured to be larger than the first angle. Because of this configuration, a movement amount of each engaging portion in the direction opposite to the driving operation when each of the engaging portions engages one of the engaged portions can be kept roughly constant. Thus, the engaging portions properly engage one of the plurality of engaged portions arranged at equal intervals in the driving direction. As a result, the driver can be smoothly moved upward.

According to another feature of the present disclosure, the wheel includes a small diameter outer circumferential edge positioned inside of an outermost peripheral end of the outer position engaging portions in the radial direction of the wheel. Furthermore, the wheel includes a large diameter outer circumferential edge positioned outside of the small diameter outer circumferential edge in the radial direction of the wheel, in a range where the outer position engaging portions are arranged. Because of this configuration, an outer circumferential edge of the wheel can be made compact. The wheel can move between the initial position and the eccentric position in the radial direction of the rotation shaft within the mechanism case that houses the lift mechanism. By making the outer circumferential edge of the wheel compact, the mechanism case that houses the lift mechanism can also be made compact.

Next, one embodiment according to the present disclosure will be described with reference to FIGS. 1 to 13. FIG. 1 shows an example of a driving tool 1, e.g., a gas-spring type driving tool that utilizes a pressure of a gas filled in a chamber above a cylinder 12 as a thrust power for driving a driving member. In the following explanation, a driving direction of the driving member N is a downward direction, and a direction opposite to the driving direction is an upward direction. In FIG. 1, a user of the driving tool 1 may be generally situated on a rear side of the driving tool 1. The rear side of the driving tool 1 may be also referred to as a user side, and a side in a forward direction may be referred to as a front side. Also, a left and right side may be based on a user's position.

Figure 3:
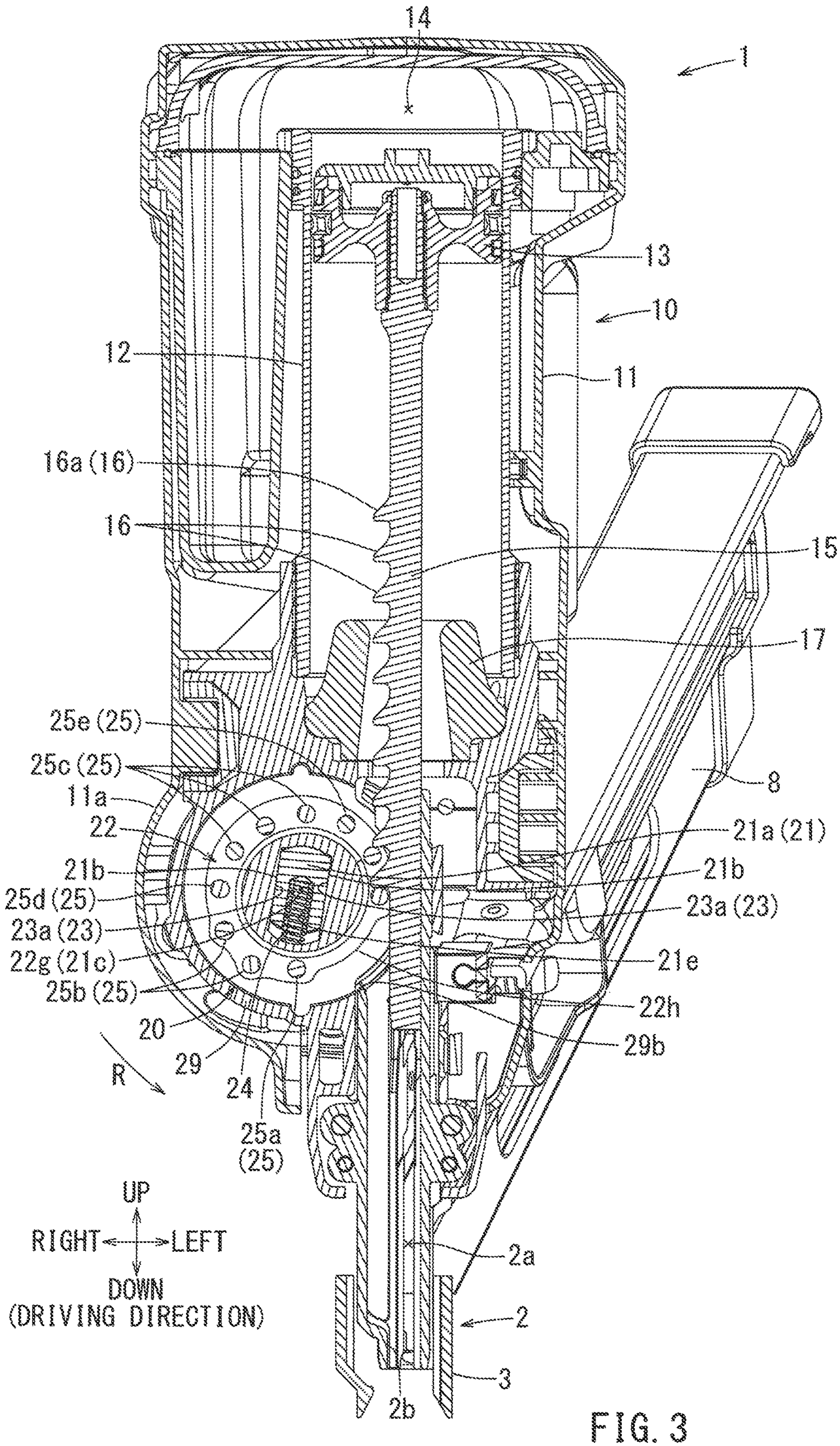
FIG. 3 is a cross-sectional view taken along line III-III of FIG. 1.

As shown in FIGS. 1 and 3, the driving tool 1 may include a tool main body 10. The tool main body 10 may be configured to include a cylinder 12 that is housed in a tubular main body housing 11. A piston 13 may be housed within the cylinder 12, so as to be able to reciprocate in an up-down direction. An upper portion of the cylinder 12 above the piston 13 may communicate with an accumulation chamber 14. A compressed gas, for example, compressed air, etc., may be filled in the accumulation chamber 14. A pressure of a gas filled in the accumulation chamber 14 may act on an upper surface of the piston 13, thereby providing a thrust power for a downward driving operation.

As shown in FIG. 3, a lower portion of the cylinder 12 may communicate with a driving passage 2*a* of a driving nose 2. The driving nose 2 may be located at a lower portion of the tool main body 10. The driving nose 2 may be combined with a magazine 8 in which a plurality of driving members N (refer to FIG. 1) is loaded. Vertically-arranged driving members N may be supplied one by one from the magazine 8 to the driving passage 2*a*. A contact arm 3 may be located at a lower portion of the driving nose 2. The contact arm 3 may be slidable in an up-down direction. The contact arm 3 may be moved upwards by pressing it against a workpiece W.

As shown in FIG. 3, a driver 15 may be connected to a lower surface of the piston 13. The driver 15 may be long and extend in an up-down direction. A lower portion of the driver 15 may enter a driving passage 2*a*. Owing to the pressure of the gas filled in the accumulation chamber 14, which is configured to act on the upper surface of the piston 13, the driver 15 may move downward within the driving passage 2*a*. A lower end of the driver 15 may drive one driving member N that is supplied to the driving passage 2*a*. The driving member N that is driven by the driver 15 may be ejected from an ejecting port 2*b* of the driving nose 2. The driving member N that is ejected from the ejecting port 2*b* may be driven into the workpiece W. A lower end damper 17 may be disposed on a lower side of the cylinder 12. The lower end damper 17 may be configured for absorbing the impact of the piston 13 when the driver 15 is driving the driving member N.

As shown in FIG. 3, a plurality of engaged portions 16 may be formed on a side (e.g., a right side) of the driver 15. In the present embodiment, ten engaged portions 16 may be arranged at equal intervals in a longitudinal direction of the driver 15, e.g., in an up-down direction. Each of the engaged portions 16 may be formed extending rightward in a rack teeth shape. Each of the engaged portions 16 may be configured to engage a corresponding engaging portion 25 of a lift mechanism 20, an embodiment of which will be discussed in detail later.

As shown in FIG. 1, a grip 4, which is configured to be held by a user, may be formed on a rear side of the tool main body 10. A trigger 5, which is configured to be pulled by a fingertip of the user, may be formed on a lower surface on the front side of the grip 4. A battery attachment portion 6 may be formed on a rear side of the grip 4. A battery pack 7 may be detachably attached to a lower surface of the battery attachment portion 6. The battery pack 7 may be removed from the battery attachment portion 6 to be repeatedly recharged by a dedicated charger. The battery pack 7 may be used as a power source for various electric power tools. The battery pack 7 may serve as a power source for a driving unit 30, and embodiment of which will be discussed in detail later.

As shown in FIG. 3, the lift mechanism 20 may be linked to a right side of the driving nose 2. The lift mechanism 20 may have a function of returning the driver 15, and accordingly the piston 13, upward after a driving operation has been completed or in some situations when the driving operation has been unsuccessfully completed. The pressure of the gas in the accumulation chamber 14 may increase owing to an upward movement of the piston 13 by the lift mechanism 20.

As shown in FIG. 1, the driving unit 30 for driving the lift mechanism 30 may be arranged on a rear side of the lift mechanism 20. The lift mechanism 20 and the driving unit 30 may be housed in approximately a tubular driving unit case 11*a*. The driving unit case 11*a* may link a lower part of the main body housing 11 to a lower part of the battery attachment portion 6. The driving unit case 11*a* may be formed integrally with the main body housing 11.

Figure 2:
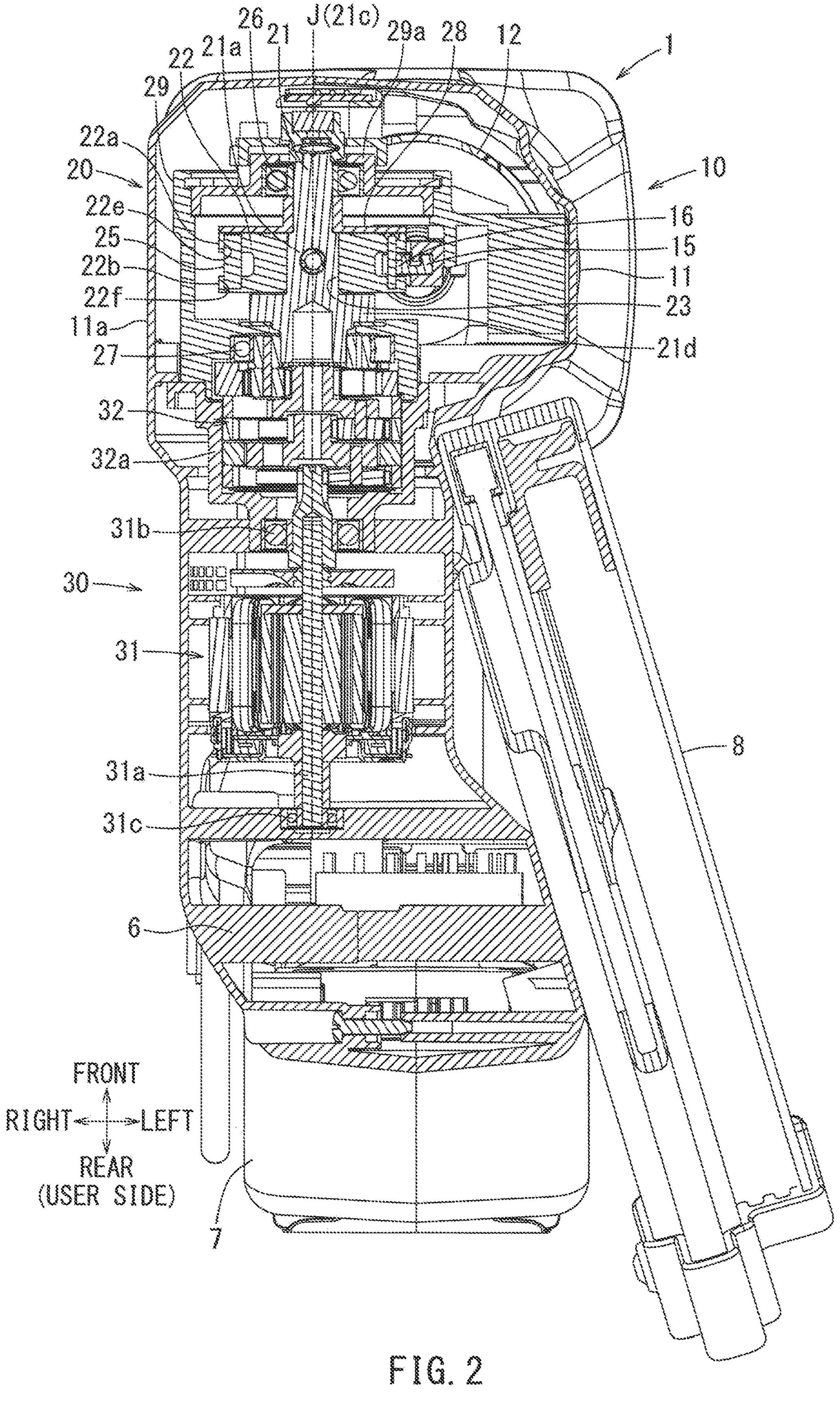
FIG. 2 is a cross-sectional view taken along line II-II of FIG. 1.

As shown in FIG. 2, the driving unit 30 may include an electric motor 31. The electric motor 31 may serve as a driving source of the driving unit 30. The electric motor 31 may be housed in the driving unit 30, such that an axis line (e.g., a motor axis line J) of an output shaft 31*a* of the electric motor 31 is disposed in a front-rear direction and perpendicular to the driving direction. In FIG. 2, the driving direction may be a direction perpendicular to a paper surface of FIG. 2. The electric motor 31 may be operated by power supplied from the battery pack 7. The electric motor 31 may be activated by a pull operation of the trigger 5 or any other suitable operation.

As shown in FIG. 2, the output shaft 31*a* of the electric motor 31 may be rotatably supported by the driving unit case 11*a*, via bearings 31*b*, 31*c*. A front portion of the output shaft 31*a* may be connected to a reduction gear train 32. The reduction gear train 32 may be supported on an inner peripheral side of a gear train case 32*a*. The gear train case 32, which is formed in approximately a tubular shape, may be housed in the driving unit 11*a*. The reduction gear train 32 may include a three-staged planetary gear. The gears of the three-staged planetary gear may be disposed coaxial to each other, and may be disposed coaxial with the motor axis line J. A rotational output of the electric motor 31 may be output to the forward lift mechanism 20, for instance after being reduced by the reduction gear train 32, which may include the three-staged planetary gear train.

As shown in FIG. 2, the lift mechanism 20 may include a rotation shaft 21 that is connected to the reduction gear train 32. The lift mechanism 20 may also include a wheel 22 that is supported by the rotation shaft 21. The lift mechanism 20 may be housed in a mechanism case 29. The mechanism case 29, which is formed in approximately a tubular shaped, may be housed in the driving unit case 11*a*. A rotation axis 21*c* of the rotation shaft 21 may be aligned with the motor axis line J. A front portion of the lift mechanism 20 may be covered with a cover 29*a*. A front end of the rotation shaft 21 may be rotatably supported by a bearing 26. The bearing 26 may be held by the cover 29*a* of the lift mechanism 29. A rear end of the rotation shaft 21 may be supported by a final-staged carrier of the reduction gear 32. The final-staged carrier of the reduction gear 32 may be rotatably supported by the mechanism case 29 via a bearing 27. The bearing 27 may be disposed on an outer periphery side of the final-staged carrier of the reduction gear 32. When the electric motor 31 is activated, the rotation shaft 21 and the wheel 22 of the lift mechanism 20 may integrally rotate in a direction indicated by an arrow R in FIG. 3 (in a counterclockwise direction in FIG. 3).

Figure 5:
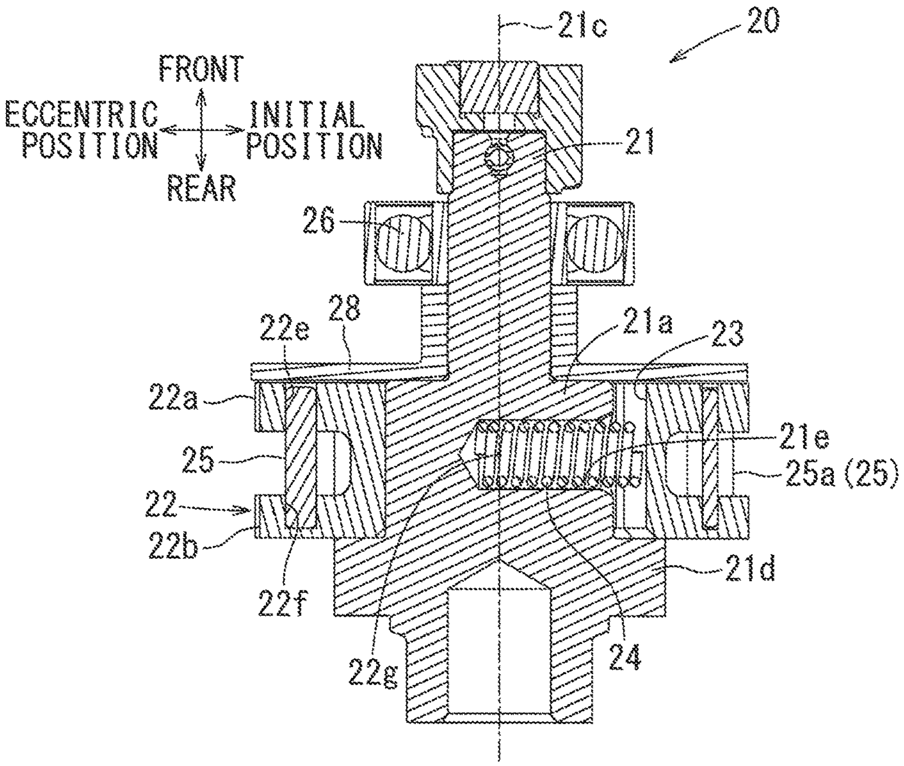
FIG. 5 is a lateral cross-sectional view of the lift mechanism, in which a wheel is at an initial position.
Figure 6:
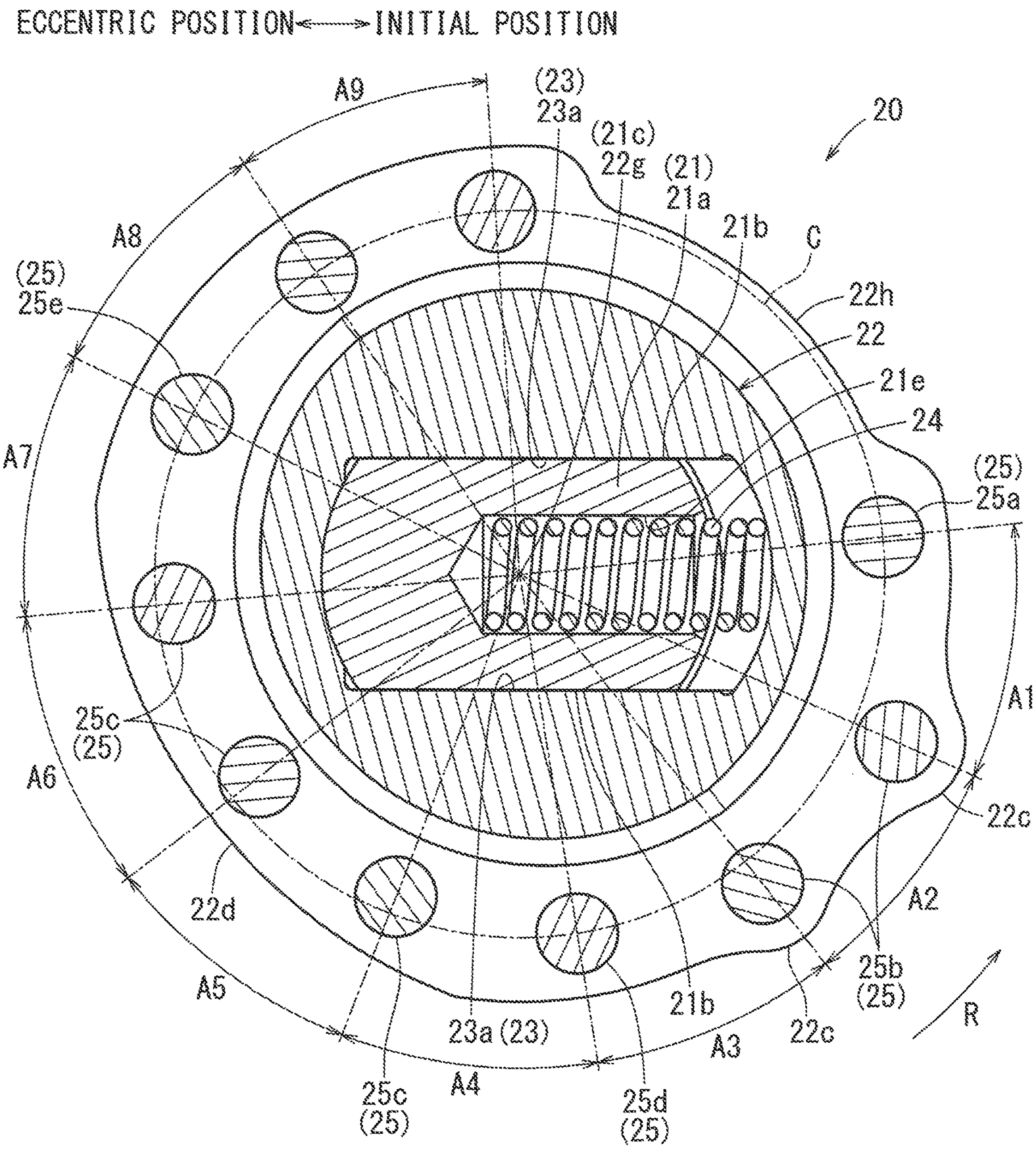
FIG. 6 is a longitudinal cross-sectional view of the lift mechanism, in which the wheel is at in initial position.

As shown in FIGS. 5 and 6, a supporting member or portion 21*a* for supporting the wheel 22 may be disposed in a center part of the rotation shaft 21 in a front-rear direction. The supporting member 21*a* may be formed in approximately a cylindrical shape. The supporting member 21*a* may include a pair of supporting surfaces 21*b* parallel to each other and extending in a radial direction of the rotation shaft 21. The supporting member 21*a* may also include a spring housing portion 21*e* between the pair of the supporting surfaces 21*b*. The spring housing portion 21*e* may be recessed along the pair of the supporting surfaces 21*b*. The spring housing portion 21*e* may be open at an end surface of the supporting member 21*a*. A compression spring 24 for biasing the wheel 22 in a radial direction of the wheel 22 may be housed in the spring housing portion 21*e*. In this embodiment, a side of the open end surface of the supporting member 21*a* may correspond to a side of an initial position of the wheel 22, which will be discussed in detail later.

Figure 4:
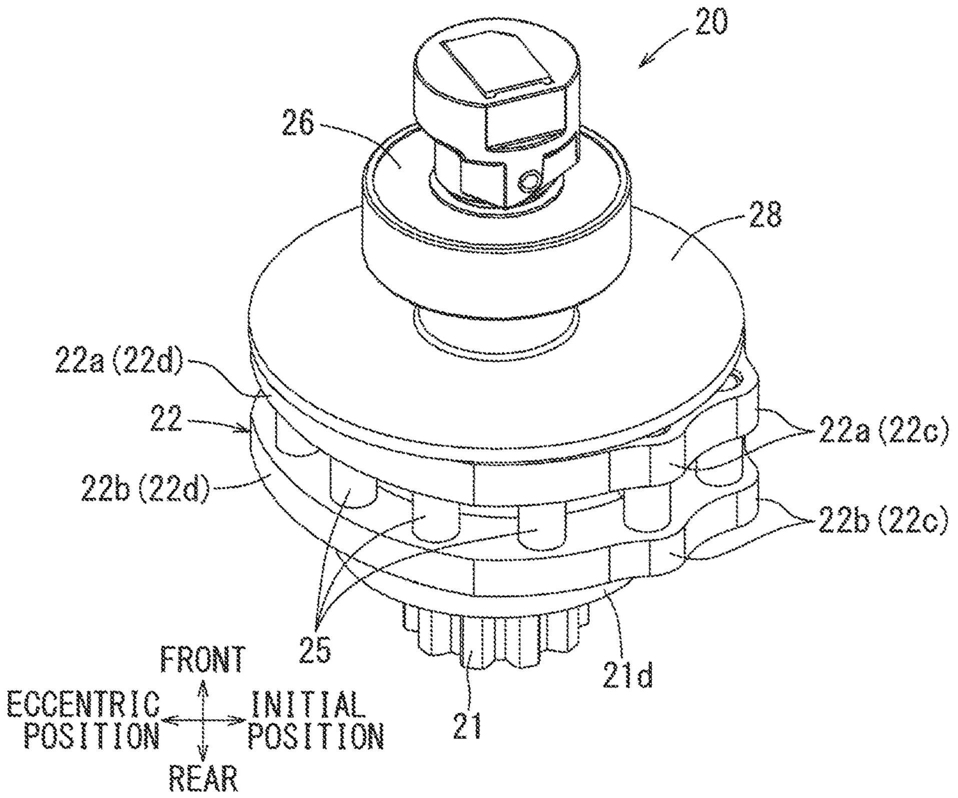
FIG. 4 is a perspective view of a lift mechanism.

As shown in FIGS. 4 and 5, a flange 21*d* may be formed at a rear portion of the rotation shaft 21. The flange 21*d* may be formed in a disk-like shape, extend in a radial direction further outward than the supporting member 21*a*, and be positioned behind the supporting member 21*a*. A front surface of the flange 21*d* may contact a rear surface of the wheel 22. A cover 28 may be attached to approximately a middle portion of the rotation shaft 21 and may be positioned in front of the supporting member 21*a*. The cover 28 may be formed in a disk-like shape with approximately the same diameter as an outer circumferential edge of the wheel 22. The cover 28 may be attached in front of the wheel 22 once the wheel 22 is positioned on the supporting member 21*a*. A rear surface of the cover 28 may contact a front surface of the wheel 22. The wheel 22 may be restricted from moving in the front-rear direction by being held between the flange 21*d* and the cover 28.

Figure 7:
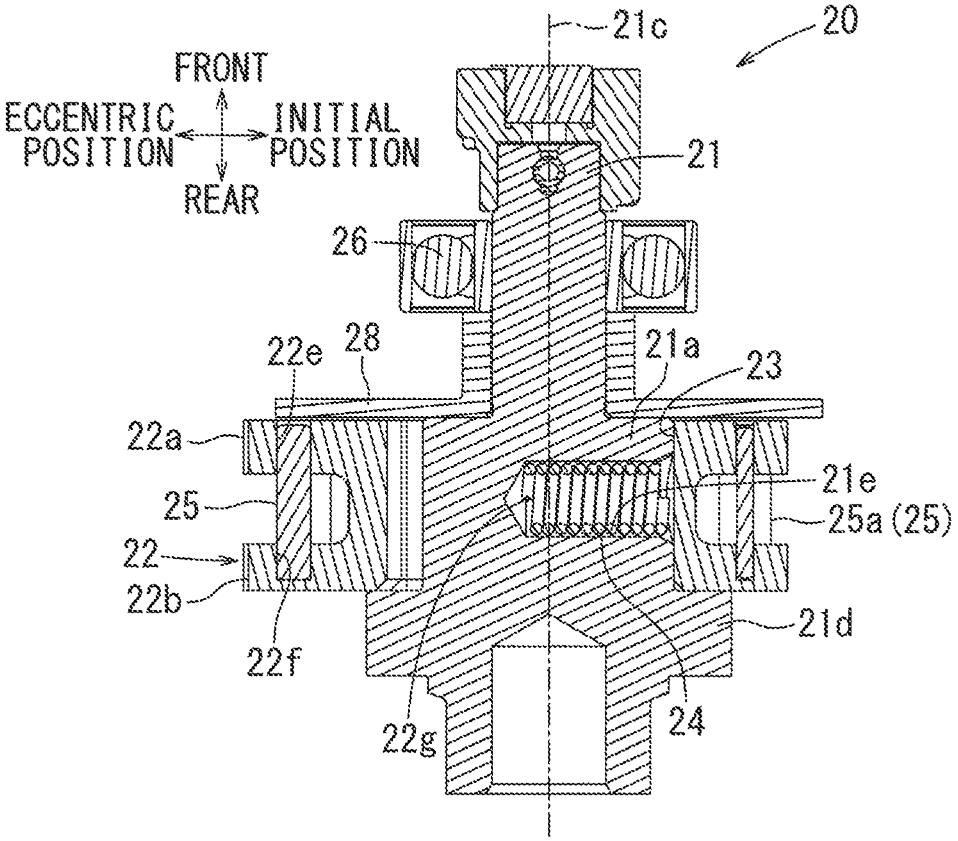
FIG. 7 is a lateral cross-sectional view of the lift mechanism, in which the wheel is at an eccentric position.

As shown in FIGS. 5 to 7, the wheel 22 may include, aro and a center thereof, a mounting hole 23 through which the supporting member 21*a* of the rotation shaft 21 can be inserted. A pair of slide surf aces 23*a* may be formed on an inner wall surface of the mounting hole 23, so as to be parallel to each other and to extend in the radial direction of the wheel 22. A distance between the pair of the slide surf aces 23*a* may be approximately the same as that between the pair of the supporting surfaces 21*b* of the supporting member 21*a*. When the supporting member 21*a* is inserted into the mounting hole 23, each of the slide surfaces 23*a* may face and contact a corresponding supporting surface 21*b*. The pair of slide surfaces 23*a* may be configured to slidably contact the pair of supporting surface 21*b*, such that the wheel 22 may move in the radial direction of the rotation shaft 21 within a predetermined range. In the following explanation, as shown in FIGS. 5 and 6, when a center 22*g* of the wheel 22 is on the rotation axis 21*c* of the rotation shaft 21, a position of the wheel 22 relating to the rotation shaft 21 may be ref erred to as an initial position. Furthermore, as shown in FIG. 7, when the center 22*g* of the wheel 22 is deviated from (e.g., misaligned with) the axis line 21*c* of the rotation shaft 21, a position of the wheel 22 relating to the rotation shaft 21 may be referred to as an eccentric position. The rotation shaft 21 has a first axis of rotation 21*c* and the wheel 22 has a second axis of rotation. In the initial position, the first axis of rotation and the second axis of rotation are co-axial. In the eccentric position, the first axis of rotation and the second axis of rotation are spaced and parallel.

As shown in FIGS. 5 to 7, the compression spring 24 housed in the spring housing portion 21*e* of the supporting member 21*a* may bias a wall surface of the mounting hole 23 in the radial direction of the wheel 22. In other words, the wheel 22 may be biased from the eccentric position to the initial position with respect to the supporting member 21*a*. Because of this configuration, when an external force is not applied to the wheel 22, the wheel 22 may remain in the initial position. In contrast, when an external force larger than a certain value is applied to the wheel 22 in a direction toward the eccentric position, the wheel 22 may move from the initial position toward the eccentric position against the biasing force of the compression spring 24.

As shown in FIGS. 4 to 6, a plurality of engaging portions 25 may be disposed along an outer periphery of the wheel 22. In the present embodiment, for example, ten engaging portions 25 may be provided. Each of the plurality of engaging portions 25 may be a shaft member formed in a cylindrical shape, for example, a pin, etc.

As shown in FIG. 3, a left portion of the wheel 22 may enter the driving passage 2*a* through a window 29*b* formed in the mechanism case 29. Each of the engaging portions 25 of the wheel 22 may be configured to engage one of the engaged portions 16 of the driver 15 in the driving passage 2*a*. When the wheel 22 rotates in a direction indicated by an arrow R with at least one of the engaging portions 25 engaging one of the engaged portions 15, the driver 15 and the piston 13 may return upward.

As shown in FIGS. 4 and 5, the wheel 22 includes a front flange 22*a* and a rear flange 22*b* in the front-rear direction. The front flange 22*a* and the rear flange 22*b* may be parallel to each other and may be spaced apart by a predetermined length. The front flange 22*a* and the rear flange 22*b* may be formed such that a configuration of the front flange 22*a* extending in the radial direction is the same or substantially the same as that of the rear flange 22*b*. A plurality of circular through holes 22*e* may be formed in the front flange 22*a*. The plurality of through holes 22*e* may be disposed in an area along the outer periphery of the front flange 22*a* at predetermined positions and may correspond to where the engaging portions 25 are arranged. Furthermore, a plurality of circular grooves 22*f* may be formed on a front surface side of the rear flange 22*b*. The plurality of grooves 22*f* may be disposed in an area along the outer periphery of the rear flange 22*b* at positions where the grooves 22*f* and the through holes 22*e* align in the front-rear direction. Each of the through holes 22*e* and the grooves 22*f* may have approximately the same diameter as that of a corresponding engaging portion 25 that is to be inserted thereinto. The plurality of engaging portions 25 may be inserted into the corresponding through holes 22*e* and the grooves 22*f*, and then the cover 28 may be attached to the middle portion of the rotation shaft 21. Because of this configuration, the plurality of engaging portions 25 may be held between the front flange 22*a* and the rear flange 22*b* in an area along the outer periphery of the front and rear flanges 22*a*, 22*b*.

Each of the engaging portions 25, shown in, for example, FIG. 3, may be supported by the wheel 22, so as to be rotatable around the central axis of each corresponding engaging portion 25. Because of this configuration, the same portion of the outer peripheral surface of each engaging portion 25 may be prevented from contacting the engaged portion 16 continually. Thus, abrasion of the engaging portions 25 can be suppressed.

As shown in FIG. 6, the plurality of engaging portions 25 may be arranged such that some of the engaging portions 25 have different distances from the center 22*g* of the wheel 22 than others. Furthermore, in some embodiments, the plurality of engaging portions 25 may be arranged at predetermined angle intervals in a circumferential direction around the center 22*g*. In the present embodiment, ten engaging portions 25 may be arranged at a predetermined angle interval in an area spanning approximately three-fourths of the wheel 22. The engaging portions 25 may be absent in an area spanning approximately one-fourths of the wheel 22. In the following explanation, a circumferential area in which the engaging portions 25 are not arranged may be referred to as a recessed portion 22*h*.

As shown in FIG. 6, the engaging portion 25 rearwardly adjacent the recessed portion 22*h* in the rotation direction of the wheel 22 may be referred to as a first engaging portion 25*a*. When the wheel 22 is disposed at the initial position, a center of the first engaging portion 25*a* may be disposed on a reference circle C that has a reference distance from a center (the rotation axis 21*c*) of the rotation shaft 21. Two engaging portions 25 rearwardly adjacent to the first engaging portion 25*a* in the rotation direction of the wheel 22 may be referred to as outer position engaging portions 25*b*. When the wheel 22 is disposed at the initial position, each center of the outer position engaging portions 25*b* may be disposed outward in a radial direction of the reference circle C. An engaging portion 25 rearwardly adjacent to the two outer position engaging portions 25*b* in the rotation direction of the wheel 22 may be referred to as a first intermediate engaging portion 25*d*. When the wheel 22 is disposed at the initial position, a center of the first intermediate engaging portion 25*d* may be disposed on the reference circle C.

Furthermore, as shown in FIG. 6, three engaging portions 25 positioned rearwardly adjacent to the first intermediate engaging portion 25*d* in the rotation direction of the wheel 22 may be referred to as inner position engaging portions 25*c*. When the wheel 22 is in the initial position, each center of the inner position engaging portions 25*c* may be disposed inward in the radial direction of the reference C. An engaging portion 25 rearwardly adjacent to the three inner position engaging portions 25*c* in the rotation direction of the wheel 22 may be referred to as a second intermediate engaging portion 25*e*. When the wheel 22 is in the initial position, a center of the second intermediate engaging portion 25*e* may be disposed on the reference circle C. Furthermore, when the wheel 22 is in the initial position, each center of the two engaging portions 25 disposed between the second intermediate engaging portion 25*e* and the recessed portion 22*h* may be disposed on the reference circle C.

As shown in FIG. 6, adjacent engaging portions 25 may have an angle between each other as measured with respect to the center 22*g* of the wheel 22 and each center of the engaging portions 25. Each angle may be referred to as A1, A2, A3, A4, A5, A6, A7, A8, A9 starting from the first engaging portion 25*a* and proceeding in order in a direction opposite to the direction indicated by the arrow R in FIG. 6. The combined angle of angles A1, A2, and A3 may be approximately 90°. The combined angle of angles A1 to A6 may be approximately 180°. Furthermore, the combined angle of angles A1 to A7 may be larger than 180°. Accordingly, the first engaging portion 25*a* and the first intermediate engaging portion 25*d*, which are disposed on the reference circle C when the wheel 22 is in the initial position, and the outer position engaging portions 25*b* may be arranged in a range between 0° to 90° of the rotation of the wheel 22 in the forward direction. Furthermore, the first intermediate engaging portion 25*d*, which is disposed on the reference C when the wheel 22 is in the initial position, and the inner position engaging portions 25*c* may be arranged in a range between 90° to 180° of the rotation of the wheel 22 in the forward direction. The engaging portions 25 arranged in a range between 180° to 360° of the rotation of the wheel 22 in the forward direction may be disposed on the reference circle C when the wheel 22 is in the initial position.

The angles A1 to A9 indicated in FIG. 6 may be configured such that the longer a distance between the center 22*g* of the wheel 22 and a center of the engaging portion 25, the smaller the angle formed. In contrast, the angles A1 to A9 may be configured such that the shorter a distance between the center of the wheel 22 and a center of the engaging portion 25, the larger the angle formed. For example, the angles A1, A2, and A3, in which at least one of the two engaging portions 25 forming the angle is an outer position engaging portion 25*b*, may be smaller than the angles A8 and A9, in which both engaging portions 25 forming the angle are disposed on the reference circle C when the wheel 22 is in the initial position. In the present embodiment, the angles A1, A2, and A3 may correspond to a first angle. As another example, the angles A4, A5, A6, and A7, in which at least one of the two engaging portions 25 forming the angle is an inner position engaging portion 25*c*, may be larger than the angles A8 and A9. In the present embodiment, the angles A4, A5, A6, and A7 may correspond to a second angle. The angle A8 may have approximately the same as the angle A9. The angle A2, in which the engaging portions 25 forming the angle are outer position engaging portions 25*b*, may be smaller than the angles A1 and A3, in which only one of the engaging portions 25 forming the angle is an outer position engaging portion 25*b*. The angles A5 and A6, in which both the engaging portions 25 forming the angle are inner position engaging portions 25*c*, may be larger than the angles A4 and A7, in which only one of the engaging portions 25 forming the angle is an inner position engaging portion 25*c*.

As shown in FIG. 6, the wheel 22 may include a large diameter outer circumferential edge 22*c* in a range where the outer position engaging portions 25*b* are provided. The large diameter outer circumferential edge 22*c* may be outside of the outer position engaging portions 25*b* in the radial direction of the wheel 22. The wheel 22 may also include a small diameter outer circumferential edge 22*d* in a range where the inner position engaging portions 25*c* are provided. The small diameter circumferential edge 22*d* may be outside of the inner position engaging portions 25*c* in the radial direction of the wheel 22. The small diameter outer circumferential edge 22*d* may be positioned inside of an outermost peripheral end of the outer position engaging portions 25*b* from the center 22*g* of the wheel 22 in the radial direction of the wheel 22. The large diameter outer circumferential edge 22*c* may be positioned outside of the small diameter outer circumferential edge 22*d* from the center 22*g* of the wheel 22 in the radial direction of the wheel 22.

Next, a sequence of a driving operation of the driving tool 1 will be discussed below. The FIG. 3 shows one embodiment of a standby state of the piston 13 and the driver 15, although in other embodiments the standby state may be different. The piston 13 and the driver 15 in this embodiment of the standby state may be held slightly below an upper end position. In this standby state, an engaging portion 25, which is disposed forwardly adjacent to the recessed portion 22*h* of the wheel 22 in the rotation direction of the wheel 22, may engage a lower surface of a lowermost engaged portion 16 of the driver 15.

When the contact arm 3 is in the upward position and the trigger 5 is in the pulled position when the piston 13 is in the standby state, the electric motor 31 may be activated. When the electric motor 31 is activated, the wheel 22 may rotate, for example, in a rotation direction indicated by an arrow R in FIG. 3. The engaging portion 25 disposed forwardly adjacent to the recessed portion 22*h* of the wheel 22 in the rotation direction of the wheel 22 may move the lowermost engaged portion 16 of the driver 15 in an upward direction. Because of this configuration, the piston 13 and the driver 15 may move from the standby position to an upper end position. When the driver 15 reaches the upper end position, which is a state just before a driving operation is performed, a driving member N (refer to FIG. 1) may be supplied from the magazine 8 to the driving passage 2*a*. When the wheel 22 further rotates, the engaging portion 25 of the wheel 22 may disengage from the engaged portion 16 of the driver 15. Because of this configuration, the piston 13 and the driver 15 may move downward owing to the gas pressure in the accumulation chamber 14. The driver 15 may move downward in the driving passage 2*a*, thereby driving a driving member N.

While the driver 15 moves downward, all of the engaging portions 25 of the wheel 22 may have been moved out of (retreated from) the driving passage 2*a*, so as to be disposed in the mechanism case 29. Correspondingly, the recessed portion 22*h* of the wheel 22 may be disposed in or adjacent to the driving passage 2*a*. Because of this configuration, interference between the engaging portions 25 and the engaged portions 16 of the driver 15 may be prevented, thereby allowing for the smooth performance of a driving operation.

Figure 8:
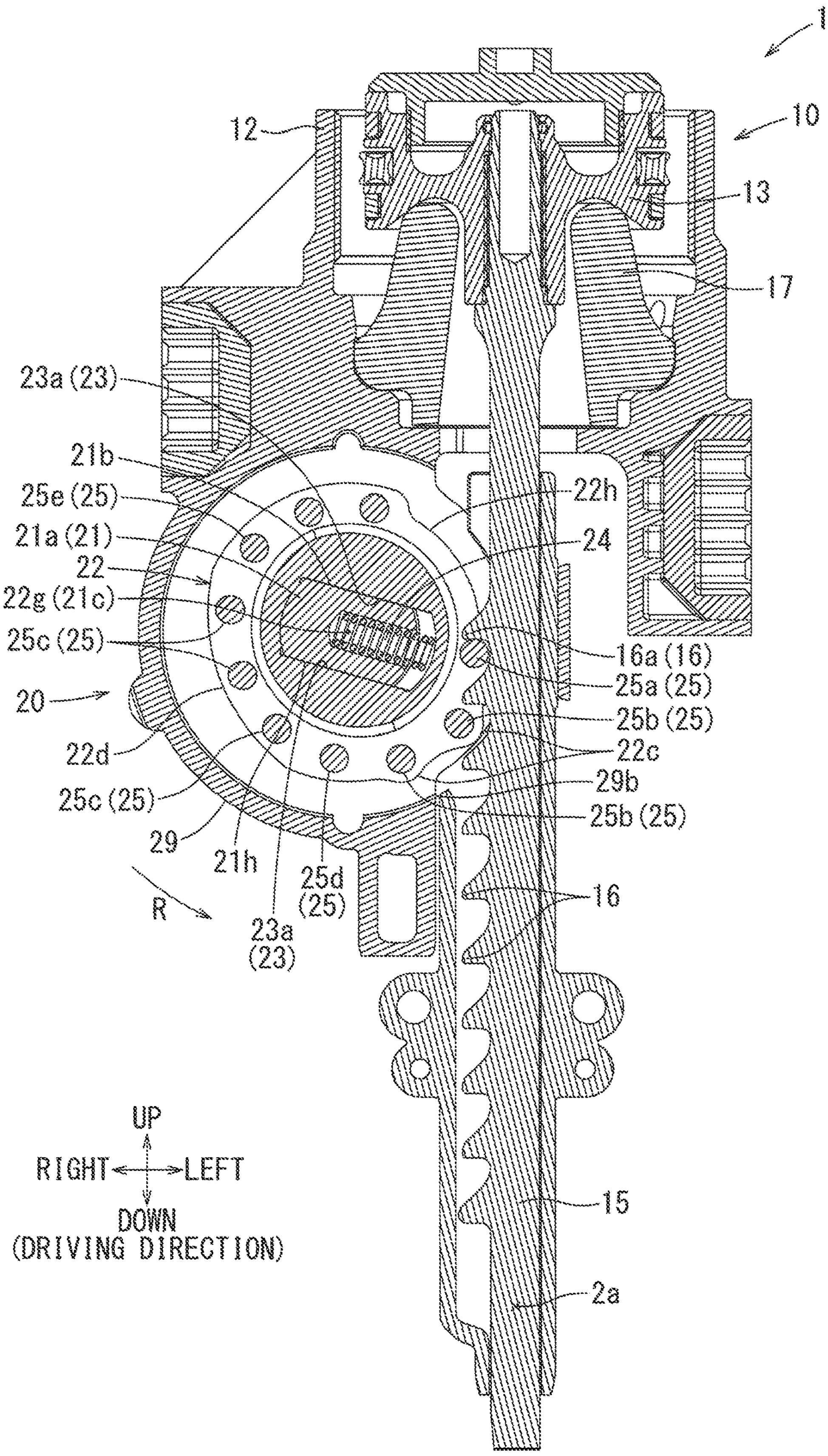
FIG. 8 is a longitudinal cross-sectional view of the lift mechanism and a driver. This figure shows that the wheel is at the initial position and a first engaging portion engages a first engaged portion.

After the driving member N has been driven, e.g., the driver 15 has reached a lower end position, the wheel 22 may continue to rotate, for example, in the direction indicated by the arrow R in FIG. 3 (in the counterclockwise direction). As shown in FIG. 8, the first engaging portion 25*a* may engage a lower surface of an uppermost first engaged portion 16*a* of the driver 15. Because of this configuration, the piston 13 and the driver 15 may start to move upward in a direction opposite to the driving operation. When this returning operation of the piston 13 and the driver 15 starts, the wheel 22 may be biased by the compression spring 24 toward the initial position (toward the driver 15; toward the left side in FIG. 8). Thus, the center 22*g* of the wheel 21 may be disposed on the rotation axis 21*c* of the rotation shaft 21.

A state shown in FIG. 8 may be generally referred to as a first state in which the wheel 22 is allowed to move from the initial position to the eccentric position if the wheel 22 receives an external force in a rightward direction larger than a biasing force of the compression spring 24. In FIG. 8, the first engaging portion 25*a* that engages the first engaged portion 16*a* may receive an external force from the first engaged portion 16*a* in the driving direction. However, a component (e.g., vector component) of the external force in a direction parallel to a direction in which the wheel 22 moves from the initial direction to the eccentric position may not be generated, or may be small. Because of this configuration, the wheel 22 may be biased in the leftward direction by the compression spring 24 and thus the wheel 22 may retain in the initial position. For instance, the above mentioned component of the external force received by the first engaging portion 25*a* may not be greater than the biasing force of the compression spring 24.

As the wheel 22 continues to rotate, the two outer position engaging portions 25*b* may sequentially engage a lower surface of the engaged portion 16. The two outer position engaging portions 25*b* may be disposed outside of the first engaging portion 25*a* in the radial direction of the wheel 22 with respect of the center 22*g* of the wheel 22. Because of this configuration, the outer position engaging portion 25*b* may interfere with a bottom part of the engaged portion 16 in a state where the wheel 22 is disposed at the initial position. Accordingly, the outer position engaging portion 25*b* may receive an external force from a corresponding engaged portion in the driving direction. In this state, a component (e.g., vector component) of the external force in a direction parallel to the direction in which the wheel 22 moves from the initial position to the eccentric position may be generated. Since a magnitude of this component of the external force is configured to be larger than that of the biasing force of the compression spring 21*e*, the wheel 22 may move from the initial position toward the eccentric position, thereby causing the center 22*g* of the wheel 22 to move away from the driver 15. Because of this configuration, the outer position engaging portion 25*b* may be prevented from interfering with the upward movement of the piston 13. The wheel 22 may move from the initial position toward the eccentric position against the biasing force of the compression spring 24. As a result, the wheel 22 may be at the eccentric position, which may referred to as a second state. In this position, the center 22*g* of the wheel 22 may be disposed away from the rotation axis 21*c* of the rotation shaft 21 (e.g., on a right side of the rotation axis 21*c* as seen in FIG. 8). The outer position engaging portion 25*b* may engage the engaged portion 16 in a relatively normal fashion.

After some of the outer position engaging portions 25*b* have engaged the engaged portion 16, the first intermediate engaging portion 25*d* may engage a lower surface of the engaged portion 16. In this state, the initial position of the wheel 22 may be on the upper side of the eccentric position of the wheel 22. In this state, the first intermediate engaging portion 25*d* may receive an external force from the engaged portion 16 in the downward direction. A magnitude of the external force may be, for example, roughly 10 kN. Because of this configuration, the wheel 22 may be pulled downward against the biasing force of the compression spring 24, thereby continuing to place the wheel in the eccentric position. Thus, the second wheel 22 may continue to be in the second state.

Figure 9:
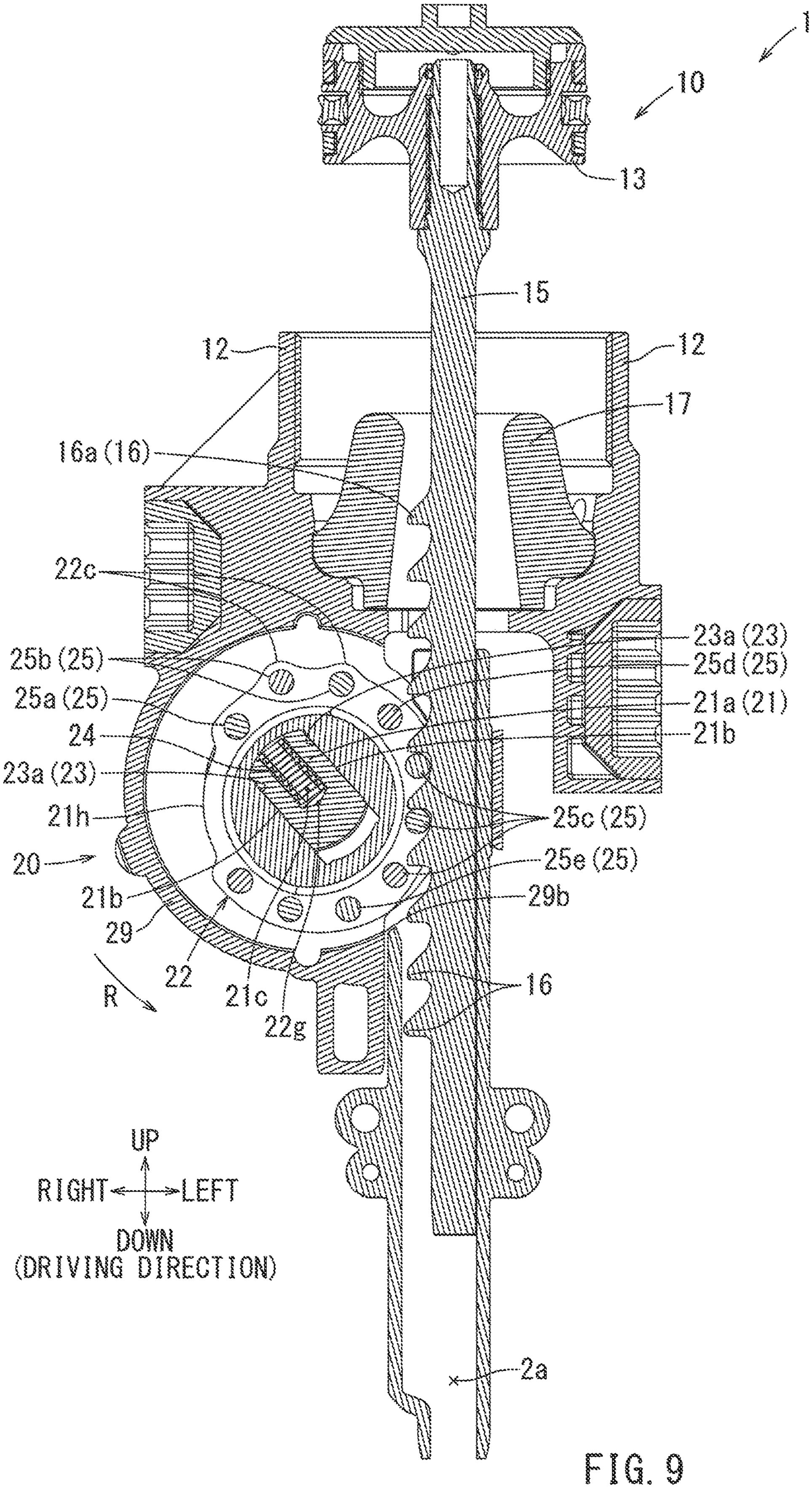
FIG. 9 is a longitudinal cross-sectional view of the lift mechanism and the driver. This figure shows that the wheel is at an eccentric position and an inner position engaging portion engages an engaged portion.

As shown in FIG. 9, after the first intermediate engaging portion 25*d* has engaged the engaged portion 16, the three inner position engaging portions 25*c* may sequentially engage a lower surface of the engaged portion 16. In this state, the initial position of the wheel 22 may be on an upper right side of the eccentric position of the wheel 22. The inner position engaging portion 25*c* may receive an external force from the engaged portion 16 in the downward direction. In this state, a magnitude of the external force may be, for example, roughly 10 kN. In this state, there may be a component (e.g., a vector component) of the external force in a direction parallel to the direction in which the wheel 22 moves from the initial position to the eccentric position. Because of this configuration, the wheel 22 may be pulled toward a lower left side direction toward the eccentric position and against the biasing force of the compression spring 24. As a result, the wheel 22 may continue to be at the second state. The inner position engaging portion 25*c* may be disposed inside of the first engaging portion 25*a* in the radial direction of the wheel 22 with respect of the center 22*g* of the wheel 22. Because of this configuration, the inner position engaging portion 25*c* may engage a bottom portion of the engaged portion in a relatively normal fashion. Additionally, because of this configuration, the center 22*g* of the wheel 22 may continue to be positioned away from the rotation axis 21*c* of the rotation shaft 21 (e.g., the wheel 22 may be at the eccentric position, which is leftward in FIG. 9).

Figure 10:
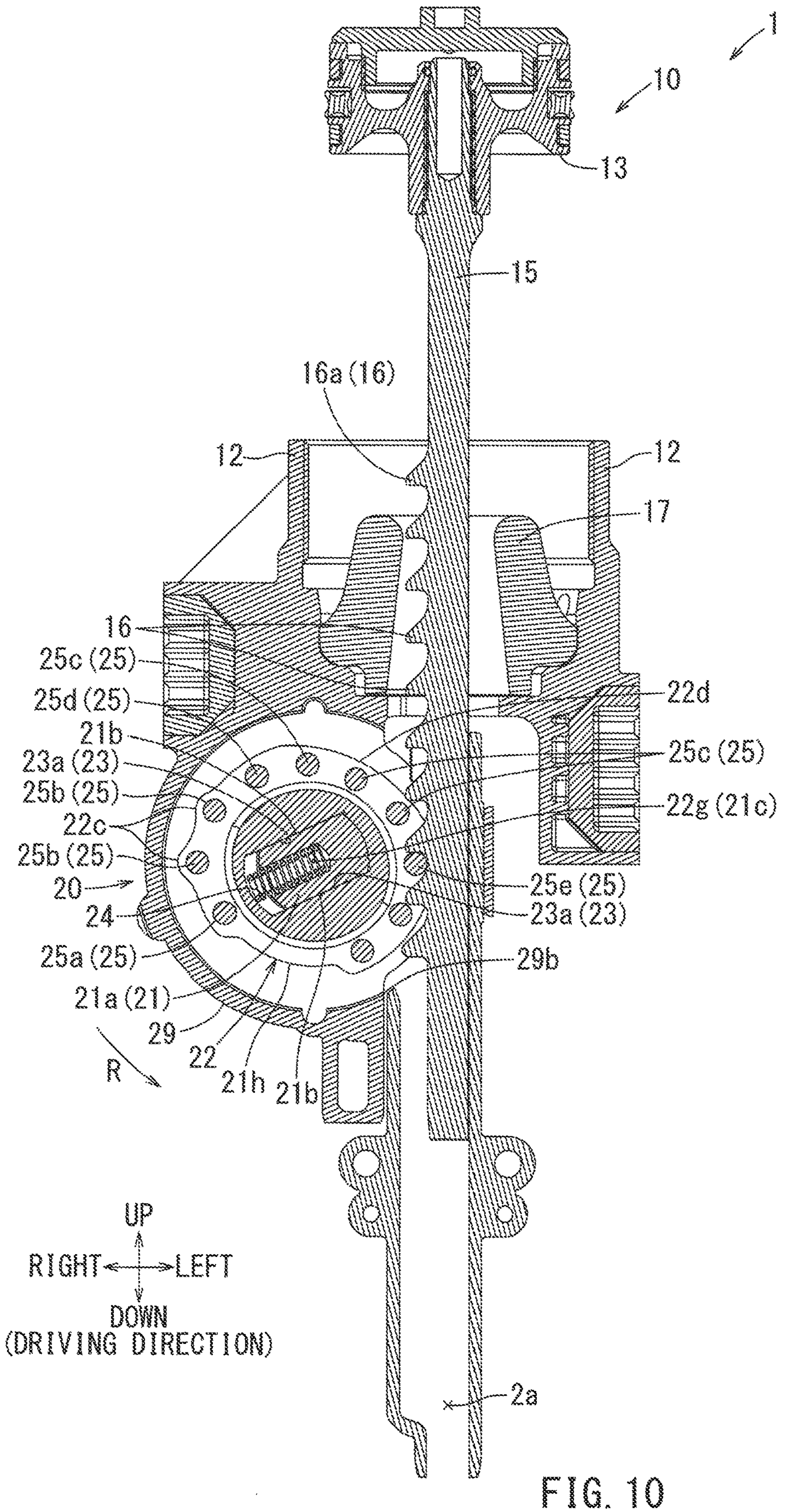
FIG. 10 is a longitudinal cross-sectional view of the lift mechanism and the driver. This figure shows that the wheel is at the initial position and a second intermediate engaging portion engages an engaged portion.

As shown in FIG. 10, after the three inner position engaging portions 25*c* have engaged the engaged portion 16, the second intermediate engaging portion 25*e* may engage a lower surface of the engaged portion 16. In this state, the initial position of the wheel 22 may be on a right side of the eccentric position of the wheel 22. The second intermediate engaging portion 25*e* may receive an external force from the engaged portion in the driving direction. In this state, a component (e.g., vector component) of the external force in a direction parallel to the direction in which the wheel moves from the eccentric position to the initial position may be generated. Thus, the wheel 22 may move (in a rightward direction in FIG. 10) from the eccentric position toward the initial position, owing to this component of the external force and the biasing force of the compression spring 22. As a result, the wheel 22 may return to the initial position.

As shown in FIG. 3, when the engaging portion 25 that is disposed forwardly adjacent to the recessed portion 22*h* in the rotation direction of the wheel 22 engages a lower surface of the lowermost engaged portion 16 of the driver 15, the piston 13 and the driver 15 may reach the above-discussed standby position. When the driver 15 and the piston 13 reach the standby position, the electric motor 31 (refer to FIG. 2) may stop. The electric motor 31 may stop, for example, by accurate control of an amount of time that has passed since activation of the electric motor 31. A sequence of the driving operation may be completed when the driver 15 and the piston 13 return to the standby state.

Figure 11:
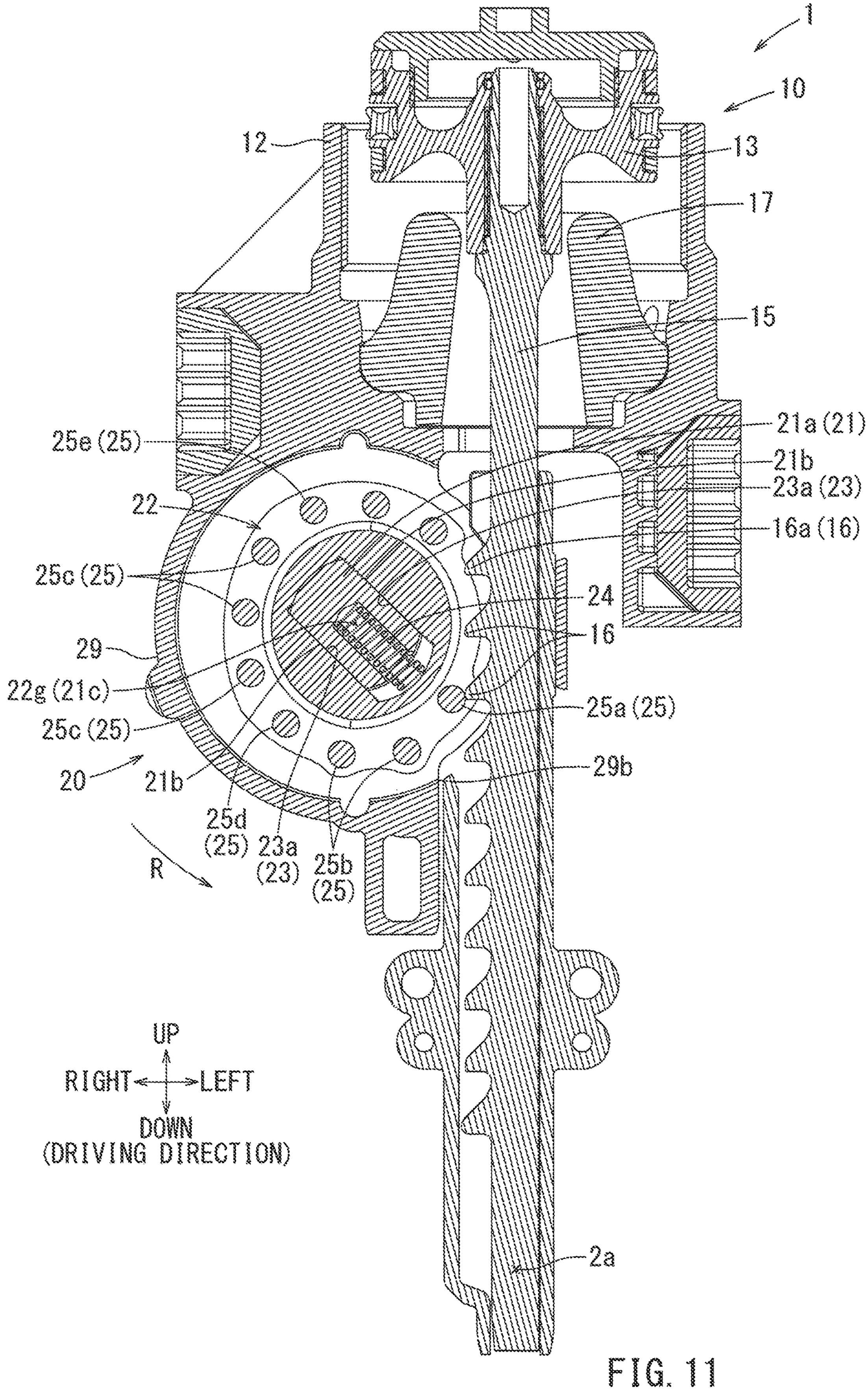
FIG. 11 is a longitudinal cross-sectional view of the lift mechanism and the driver. This figure shows that the wheel is at the initial position and the first engaging portion interferes with an engaged portion below the first engaged portion.

In a driving operation, there may be a case where a driving member N (refer to FIG. 1) driven by a downward movement of the driver 15 is not properly driven into a workpiece W. When the driving member N is not fully or properly driven into the workpiece W, clogging of the driving passage 2*a*, for instance, due to a deformed driving member N, may sometimes occur. In this case, the driver 15 may stop at a position higher than the lower end position. An example of such a higher position is shown in FIG. 11. In such a situation where the driver 15 has been stopped at the higher position, the wheel 22 may continue to rotate. Because of this phenomenon, a relative positional shift of the engaging portions 25 with regard to the corresponding engaged portions 16 may occur, which may not happen in normal operations.

Figure 12:
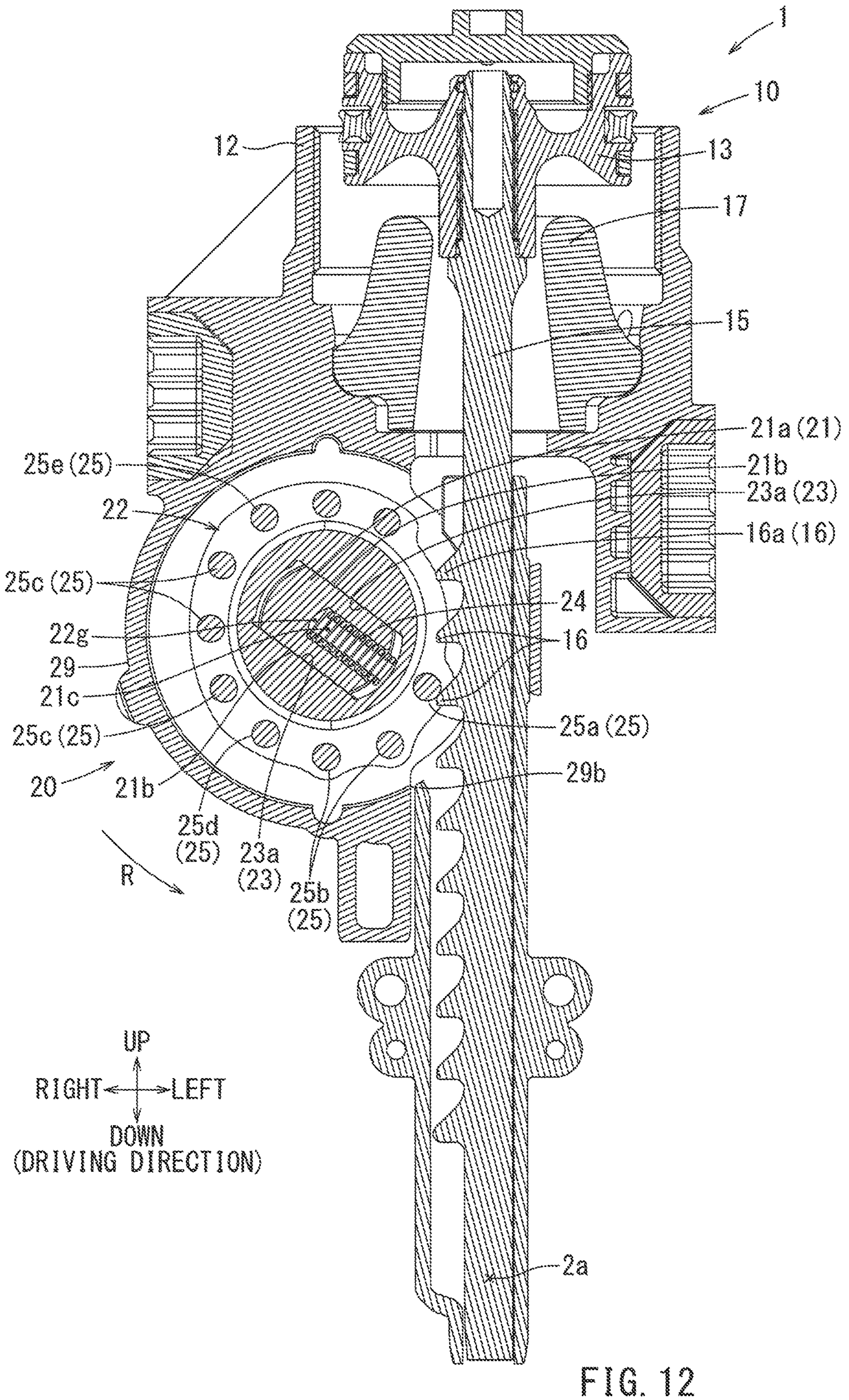
FIG. 12 is a longitudinal cross-sectional view of the lift mechanism and the driver. This figure shows that the wheel is in a moving state from the initial position shown in FIG. 11 to the eccentric position.

For example, FIG. 11 shows such a case where the first engaging portion 25*a* does not engage a lower surface of the first engaged portion 16*a*. Instead, the first engaging portion 25*a* may interfere with a tip part of an engaged portion 16 lower than the first engaged portion 16*a*. In this state, the initial position of the wheel 22 may be on a lower left side of the eccentric position. In this state shown in FIG. 11, the first engaging portion 25*a* may receive an external force from the tip part of the engaged portion 16. In this state, there may be a component (e.g., vector component) of the external force in a direction parallel to the direction in which the wheel moves from the initial position to the eccentric position. When a magnitude of the component of the external force is larger than a biasing force of the compression spring 24, the wheel 22 may move from the initial position toward the eccentric position. In the present embodiment, the wheel 22 may be configured to move toward the eccentric position and accordingly may continue to rotate in a direction indicated by the arrow R in FIG. 11 without stopping rotation. Thus, as shown in FIG. 12, the wheel 22 may move from the initial position toward the rightward eccentric position and against the biasing force of the compression spring 24. As a result, the center 22*g* of the wheel 22 may move away from the rotational axis 21*c* of the rotation shaft 21. As a result of the movement, the first engaging portion 25*a* may move (retreat) from interfering with engaged portion 16 and may move (in a rightward direction in FIG. 11) toward the eccentric position. As a result, the interference preventing the rotation of the wheel 22 due to the engaging portion 25 improperly contacting the engaged portion 16 may be accommodated for by displacement of the entirety of the wheel 22 in the radial direction of the wheel 22.

Figure 13:
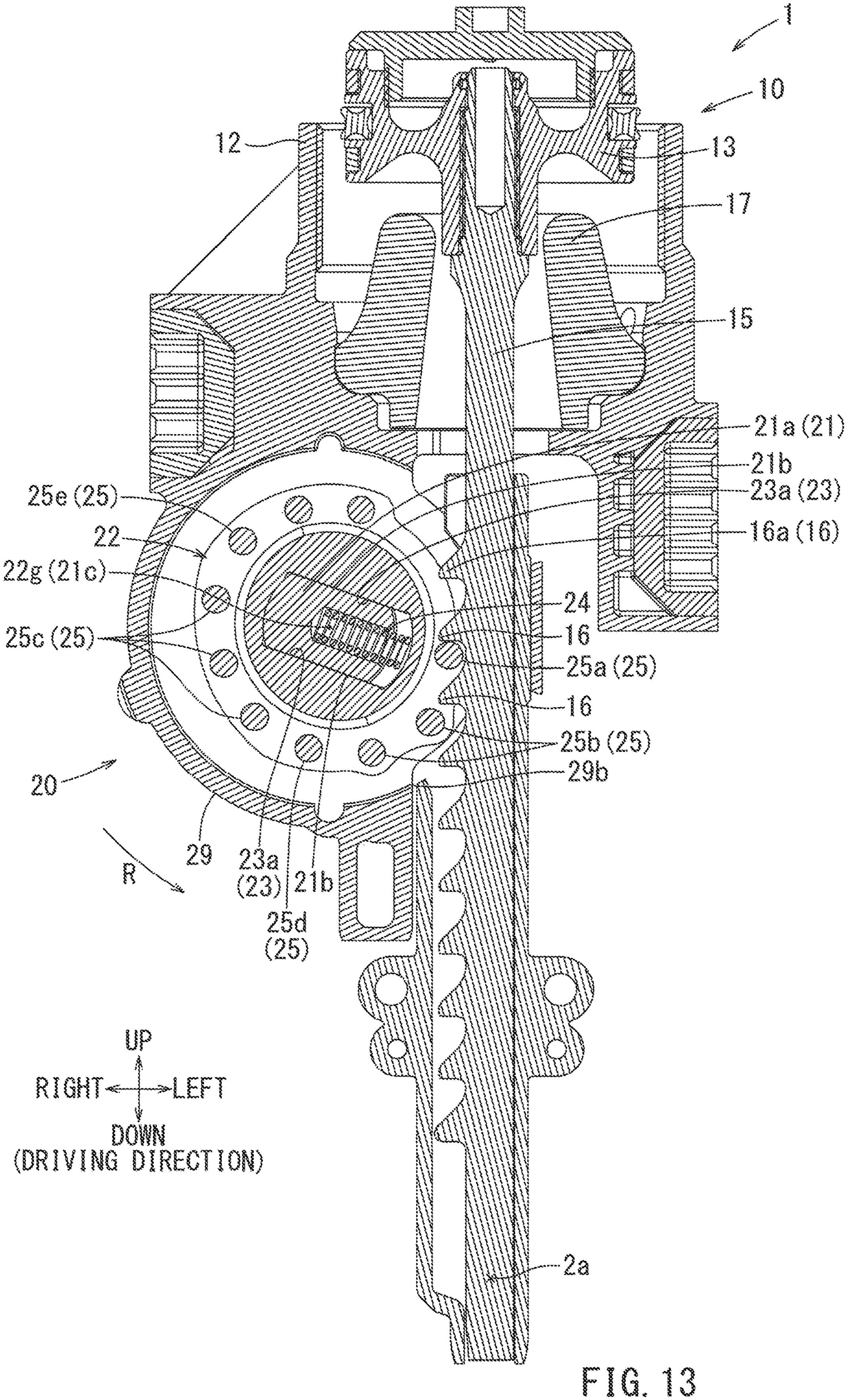
FIG. 13 is a longitudinal cross-sectional view of the lift mechanism and the driver. This figure shows that the wheel is at the initial position and the first engaging portion engages an engaged portion below the first engaged portion.

As shown in FIG. 13, the first engaging portion 25*a* may move toward the engaged portion 16 positioned directly above the engaged portion 16 that previously interfered with it. Furthermore, a pushing force of the previous engaged portion 16 applied to the first engaging portion 25*a* may be released. Because of this configuration, the wheel 22 may move toward the initial position (leftward in FIG. 13) due to the biasing force of the compression spring 24. Thus, the first engaging portion 25*a* may engage a lower portion of the next engaged portion 16. As a result, the piston 13 and the driver 15 may move upward by the rotation of the wheel 22. When the wheel 22 rotates such that the piston 13 and the driver 15 reach the standby position or near the standby position, the electric motor 31 (refer to FIG. 2) may be configured to stop, for example, by detection of a position of the driver 15. At this stage while a downward movement of the driver is prohibited, the deformed driving member N (refer to FIG. 1) clogging in the driving passage 2*a* can be removed.

As discussed above, the driving tool 1 may include the piston 13 that moves in the downward direction owing to gas pressure. The driving tool 1 may include the driver 15 that extends from the piston 13 in the driving direction. The driver 15 may include the plurality of engaged portions 16 arranged side by side in the driving direction. The driving tool 1 may include the lift mechanism 20 that moves the driver 15 in the direction opposite to the driving direction. The lift mechanism 20 may include the rotation shaft 21 and the wheel 22. The wheel 22 may integrally rotate around the rotation shaft 21 with the rotation shaft 21. The lift mechanism 20 may include the plurality of engaging portion 25, each of which is configured to engage a corresponding engaged portion 16 formed in the driver 15. The plurality of engaging portions 25 may be arranged along an outer periphery of the wheel 22. The lift mechanism 20 may be provided with the rotation shaft 21 that includes the supporting member 21*a*. The supporting member 21*a* may support the wheel 22 so that the wheel 22 is movable in the radial direction of rotation shaft 21 between the initial position and the eccentric position with respect to the rotation shaft 21. In the lift mechanism 20, the wheel 22 may be displaceable between the first state and the second state. When the driver 15 moves in a direction opposite to the driving direction, the wheel 22 may be in the first state or in the second state. In the first state, the wheel 22 may engage the driver 15 at the initial position such that it is movable (retreatable) toward the eccentric position. In the second state, the wheel 22 may engage the driver 15 when the wheel 22 is at the eccentric position.

Accordingly, when a returning operation of the driver 15 is performed normally and properly, the wheel 22 may be at the initial position or at the eccentric position according to a rotation angle of the wheel 22. In either case where the wheel 22 is at the initial position or at the eccentric position, one of the engaging portions 25 of the lift mechanism 20 may adequately engage an engaged portion 16 of the driver 15. Because of this configuration, an upward returning operation of the driver 15 may continue properly and satisfactorily. In contrast to the above normal case, there may be a case where a nail jamming may occur when a driving operation is being performed, which could cause the driver 15 to stop at unspecified position. In this case, the engaging portion 25 may not properly engage a corresponding engaged portion 16, thereby causing the engaging portion 25 to improperly contact the engaged portion 16. In such a case, the wheel 22 may move (retreat) from the initial position toward the eccentric position. As a result, the interference of the engaging portion 25 with the engaged portion 26 may be accommodated for. After the improper interference of the engaging portion 25 with the engaged portion 16 has been accommodated for, the wheel 22 may move toward the initial position or toward the eccentric position, such that the engaging portion 25 may adequately engage one of the other engaged portion 16. As a result, an upward returning operation of the driver 15 may be performed successively.

As shown in FIG. 8, the driving tool 1 may include the compression spring 24 that biases the wheel 22 from the eccentric position toward the initial position. Because of this configuration, when the wheel 22 is at the initial position and also the engaging portion 25 normally engages one of the engaged portions 16, unexpected movement (retreat) of the engaging portion 25 with respect to the engaged portion 16 may be prevented. In a case where the engaging portion 25 does not normally engage the engaged portion 16 due to interference with the engaged portion 16, the wheel 22 may move from the initial position toward the eccentric position. After the improper interference between the engaging portion 25 and the engaged portion 16 has been accommodated for, the wheel 22 may move (return) to the initial position smoothly. Thus, the engaging portion 25 may still engage one of the engaged portion 16. As a result, a returning operation of the driver 15 may be smoothly and quickly performed successively.

As shown in FIG. 8, the supporting member 21*a* may support the wheel 22 so that the wheel 22 can lineally move with respect to the rotation shaft 21 between the initial position and the eccentric position. The wheel 22 may be movable in a direction apart from the driver 15 only when the wheel 22 is within a predetermined rotation angle range. Accordingly, when the wheel 22 is within the predetermined rotation angle range, an improper interference between the engaging portion 25 and the engaged portion 16 may be accommodated for. In contrast, when the wheel 22 is outside the predetermined rotation angle range, the wheel 22 may not move apart from the driver 15. Thus, the engaging portion 25 may be prevented from moving (retreating) apart from the engaged portion 16 outside the predetermined rotation angle range. As a result, a returning operation of the driver 15 may be performed successively.

As shown in FIG. 6, the supporting member 21*a* may include the pair of supporting surfaces 21*b*, each of which extends in the radial direction of the rotation shaft 21 and which are parallel to each other. The wheel 22 may include the mounting hole 23 to which the supporting member 21*a* is inserted. The mounting hole 23 may include the pair of supporting surfaces 23*a*, each of which extends in the radial direction of the rotation shaft 21 and which faces a corresponding supporting surface 21. Accordingly, the wheel 22 may move between the initial position and the eccentric position by utilizing a supporting configuration of the wheel 22 supported by the rotation shaft 21. Because of this configuration, a movement configuration in which the wheel 22 is supported so as to be movable in the radial direction of the rotation shaft 21 may be made compact.

As shown in FIG. 8, one of the plurality of engaging portions 25 may be the first engaging portion 25*a* that firstly engages an engaged portion 16 when the driver 15 is moved in a direction opposite to the driving direction. The first engaging portion 25*a* may be on the reference circle C when the wheel 22 is at the initial position (refer to FIG. 6). The reference circle C may have a reference distance from the rotation axis 21*c* of the rotation shaft 21. An arrangement of each engaging portion 25 may be easily designed based on the reference circle C, such that a returning operation of the driver 15 can be properly performed successively.

As shown in FIG. 6, the plurality of engaging portions 25 may include at least one outer position engaging portion 25*b* in a range of 0° to 90° in the forward direction of the rotation of the wheel 22 starting from the first engaging portion 25*a*. A center of the outer position engaging portion 25*b* may be disposed outward of the reference circle C in the radial direction of the wheel 22. The plurality of engaging portions 25 may include at least one inner position engaging portion 25*c* in a range of 90° to 180° in the forward direction of the rotation of the wheel 22. A center of the inner position engaging portion 25*c* may be disposed inward of the reference circle C in the radial direction of the wheel 22.

Because of the above configuration, when the outer position engaging portion 25*b* engages one of the engaged portion 16, the wheel 22 may be pushed by the engaged portion 16. As a result, the wheel 22 may move from the initial position toward the eccentric position. A rotation angle of the wheel 22 may be regarded as 0° in a case where the first engaging portion 25*a* starts to engage an engaged portion 16. The wheel 22 may be configured to move from the initial position toward the eccentric position when the rotation angle of the wheel 22 is within 0° to 90°. Because the wheel 22 is configured to be at the eccentric position at the rotation angle 90° to 180°, at least one of the engaging portions may be positioned inward in the radial direction of the reference circle C. Since the inner position engaging portion 25*c* is arranged inward of the reference circle C in the radial direction of the reference circle C, the inner position engaging portion 25*c* may engage one of the engaged portion 16 without improperly interfering with each other. Thus, when the wheel 22 moves from the initial position to the eccentric position or when the wheel 22 remains at the eccentric position, a returning operation of the driver 15 can be smoothly performed successively.

As shown in FIG. 6, the plurality of engaging portions 25 may be arranged on the reference circle C or outward of the reference circle C in the radial direction of the reference circle C in the range of 0° to 90° starting from the first engaging portion 25*a* in the forward direction of the rotation of the wheel 22. Furthermore, the plurality of engaging portions 25 may be arranged on the reference circle C or inward of the reference circle C in the radial direction of the reference circle C in the range of 90° to 180° in the forward direction of the rotation of wheel 22. A rotation angle of the wheel 22 may be regarded as 0°, in a case where the first engaging portion 25*a* starts to engage the engaged portion 16. The wheel 22 may move from the initial position to the eccentric position at least once in the range of 0° to 90°. Furthermore, in the range of 90° to 180°, the wheel 22 may remain at the eccentric position and engage the engaged portion 16 without improper interference between the engaging portions 25 and the engaged portions 16.

As shown in FIG. 6, the plurality of engaging portions 25 may be arranged on the reference circle C in the range of 180° to 360° starting from the first engaging portion 25*a* in the forward direction of the rotation of the wheel 22. In the range of 180° to 360°, the wheel 22 may move to the initial position without again moving to the eccentric position. Since the plurality of engaging portions 25 is on the reference circle C in the range of 180° to 360°, the plurality of engaging portions 25 may be arranged so as not to improperly interfere with or retreat from the engaged portions 16.

As shown in FIG. 6, the two outer position engaging portions 25*b* arranged outward of the reference circle C in the radial direction of the reference circle C may have an angle A1, A2, A3, which may be referred to as a first angle, with respect to a center of the wheel 22 and an adjacent engaging portion 25. The three inner position engaging portions 25*c* arranged inward of the reference circle C in the radial direction of the reference circle C may have an angle A4, A5, A6, A7, which may be referred to as a second angle, between it and an adjacent engaging portion 25 with respect to the center of the wheel 22. The angles A4, A5, A6, A7 may be configured to be larger than the angles A1, A2, A3. Accordingly, a movement amount of each engaging portion 25 in the direction opposite to the driving operation when each of the engaging portions 25 engages one of the engaged portions 16 may be roughly constant. Thus, the engaging portions 25 may properly engage one of the plurality of engaged portions 16 arranged at equal intervals in the driving direction. As a result, the driver 15 may be smoothly moved upward.

As shown in FIG. 6, the wheel 22 may include a small diameter outer circumferential edge 22*d* and a large diameter outer circumferential edge 22*c*. The small diameter outer circumferential edge 22*d* may be inward of the outermost peripheral end of the outer position engaging portions 25*b* in the radial direction of the wheel 22. The large diameter outer circumferential edge 22*c* may be positioned outward of the small diameter outer circumferential edge 22*d* in the range corresponding to the outer position engaging portions 25*b*. Thus, an outer circumferential edge of the wheel 22 may be made compact. The wheel 22 may move between the initial position and the eccentric position in the radial direction of the rotation shaft 21 within the mechanism case 29 that houses the lift mechanism 20. By making the outer circumferential edge of the wheel 22 compact, the mechanism case 29 that houses the lift mechanism 20 may also be made compact.

The embodiment discussed above may be modified in various ways. In the above-exemplified embodiment, the lift mechanism 20 may include the wheel 22 having ten engaging portions 25 and the driver having ten engaged portions 16. However, the number of the engaging portions 25 and the engaged portions 16 may not be limited to ten. The number of the engaging portions 25 and the engaged portions 16 may be appropriately set based on, for example, a stroke length of the driver 15, and/or a size of the tool main body 10, etc.

In the above-exemplified embodiment, pin-shaped engaging portions 25 and rack-teeth-shaped engaged portions 16 are exemplified. However, configurations of the engaging portions 25 and the engaged portions 16 may not be limited to these examples. For example, the plurality of engaging portions 25 may be formed in a pinion-teeth shape, which are arranged along an outer peripheral edge of the wheel 22. Furthermore, in the above-exemplified embodiment, the plurality of engaged portions 16 are arranged at equal intervals along a longitudinal direction of the driver 15. However, the plurality of engaged portions 16 may be arranged at unequal intervals.

In the above-identified embodiment, the compression spring 24 is exemplified as a biasing member for biasing the wheel 22 toward the initial position. However, other biasing members such as, for example, a leaf spring or urethane rubber may be used. Furthermore, a biasing member for biasing the wheel 22 toward the initial position may be arranged outside of the mounting hole 23.

In the above-identified embodiment, all of the engaging portions 25 are arranged on the reference circle C or outward of the reference circle C in the radial direction of the reference circle C in the range of 0° to 90° in the forward direction of the rotation of the wheel 22. Instead, only one engaging portion 25 may be arranged outward of the reference circle C in the range of 0° to 90°.

In the above-identified embodiment, all of the engaging portions are arranged on the reference circle C or inward of the reference circle C in the radial direction of the reference circle C in the range of 90° to 180°. Instead, only one engaging portion 25 may be arranged inward of the reference circle C in the range of 90° to 180°.

In the above-identified embodiment, the rotation axis 21*c* of the rotation shaft 21 in the lift mechanism 20 is aligned (coaxial) with the motor axis line J. Instead, the rotation axis 21*c* may extend so as to be offset from and parallel to the motor axis line J. Furthermore, the rotation axis 21*c* may extend in a direction that intersects the motor axis line J.

What is claimed is:

1. A driving tool, comprising:

a piston configured to move in a driving direction by a pressure of a gas;

a driver that (i) extends from the piston in the driving direction and (ii) comprises a plurality of engaged portions spaced along the driving direction; and a lift mechanism configured to move the driver and the piston in a direction opposite to the driving direction, wherein:

the lift mechanism comprises:

a rotation shaft having a first axis of rotation;

a biasing member; and a wheel (a) configured to rotate integrally with the rotation shaft, (b) having a second axis of rotation and (c) including a plurality of engaging portions (i) spaced along a periphery of the wheel and (ii) configured to engage the plurality of engaged portions;

the rotation shaft is configured to support the wheel so as to allow the wheel to move relative to the rotation shaft in a radial direction from the rotation shaft between an initial position, in which the first axis of rotation and the second axis of rotation are co-axial, and an eccentric position, in which the first axis of rotation and the second axis of rotation are spaced and parallel;

the biasing member having a biasing force and configured to apply an entirety of the biasing force on the wheel in a direction from the eccentric position toward the initial position; and the lift mechanism and the driver are configured such that:

when the driver moves in the direction opposite to the driving direction, the wheel is at a first state or at a second state;

when the wheel is in the initial position and the first state, at least one of the plurality of engaging portions engages at least one of the plurality of engaged portions and the wheel is movable toward the eccentric position; and when the wheel is in the eccentric position and the second state, the plurality of engaging portions engages the plurality of engaged portions.

2. The driving tool according to claim 1, wherein the rotation shaft is configured to support the wheel so as to restrict a radial movement of the wheel in the radial direction of the rotation shaft to a linear movement between the initial position and the eccentric position.

3. The driving tool according to claim 2, wherein:

the rotation shaft includes a pair of flat supporting surfaces that (i) are parallel and (ii) extend in the radial direction of the rotation shaft;

the wheel includes a mounting hole into which the rotation shaft is inserted;

the mounting hole includes a pair of flat slide surfaces; and each of the pair of flat slide surfaces (i) faces a corresponding flat supporting surface of the pair of flat support surfaces and (ii) extends in the radial direction of the wheel.

4. The driving tool according to claim 1, wherein:

one of the plurality of engaging portions is a first engaging portion that firstly engages a corresponding engaged portion when the driver changes in movement from the driving direction to the direction opposite to the driving direction; and when the wheel is at the initial position, a center axis of the first engaging portion is on a reference circle having a reference distance from a center of the rotation shaft.

5. The driving tool according to claim 4, wherein:

in a range of 0° to 90° in a forward direction of a rotation direction of the wheel starting from the first engaging portion, the plurality of engaging portions include at least one outer position engaging portion having a center axis that is outward of the reference circle in the radial direction of the reference circle; and in a range of 90° to 180° in the forward direction of the rotation of the wheel starting from the first engaging portion, the plurality of engaging portions include at least one inner position engaging portion having a center axis that is inward of the reference circle in the radial direction of the reference circle.

6. The driving tool according to claim 5, wherein:

a center axis of a second engaging portion of the plurality of engaging portions in the range of 0° to 90° is on the reference circle or outward of the reference circle in the radial direction of the reference circle; and a center axis of a second engaging portion of the plurality of engaging portions in the range of 90° to 180° is on the reference circle or inward of the reference circle in the radial direction of the reference circle.

7. The driving tool according to claim 5, wherein:

in a range of 180° to 360° in the forward direction of the rotation of the wheel starting from the first engaging portion, a center axis of at least one of the plurality of engaging portions is on the reference circle.

8. The driving tool according to claim 5, wherein:

two adjacent engaging portions of the plurality of engaging portions (i) include a first one of the two adjacent engaging portions having a center axis outward of the reference circle in the radial direction of the reference circle and (ii) form a first angle with respect to the center of the rotation shaft;

another two adjacent engaging portions of the plurality of engaging portions (i) include a first one of the another adjacent engaging portion having a center axis inward of the reference circle in the radial direction of the reference circle and (ii) form a second angle with respect to the center of the rotation shaft; and the second angle is larger than the first angle.

9. The driving tool according to claim 5, wherein:

the wheel includes a small diameter outer circumferential edge positioned inside of an outermost peripheral end of the outer position engaging portions in a radial direction of the wheel; and the wheel includes a large diameter outer circumferential edge positioned outside of the small diameter outer circumferential edge in the radial direction of the wheel in a range where the outer position engaging portions are arranged.

10. The driving tool according to claim 3, wherein the rotating shaft further comprises a housing portion that houses the biasing member between the pair of flat supporting surfaces.

11. A driving tool, comprising:

a piston configured to move in a driving direction by a pressure of a gas;

a driver that (i) extends from the piston in the driving direction and (ii) comprises a plurality of engaged portions spaced along the driving direction; and a lift mechanism configured to move the driver and the piston in a direction opposite to the driving direction, wherein:

the lift mechanism comprises:

a rotation shaft having a first axis of rotation;

a wheel (i) configured to rotate integrally with the rotation shaft, (ii) having a second axis of rotation and (iii) including a plurality of engaging portions (a) spaced along a periphery of the wheel and (b) configured to engage the plurality of engaged portions; and a biasing member (i) having a biasing force and (ii) that is in the wheel;

the driver and the lift mechanism are configured such that (i) the wheel can move relative to the rotation shaft in a radial direction from the first axis of rotation and (ii) for part of the movement when the driver is moving in the direction opposite to the driving direction, the first axis of rotation and the second axis of rotation are offset and parallel; and the biasing member is configured to apply an entirety of the biasing force on the wheel in a direction in which the second axis of rotation moves toward the first axis of rotation.

12. The driving tool according to claim 11, wherein:

the driver and the lift mechanism are configured such that at a point in time when the driver is not moving in the direction opposite to the driving direction, the first axis of rotation and the second axis of rotation are co-axial.

13. The driving tool according to claim 11, wherein:

the plurality of engaging portions includes a first engaging portion that firstly engages an engaged portion of the plurality of engaged portions when the driver changes direction from the driving direction to the direction opposite the driving direction; and a relative position of the second axis of rotation to the first axis of rotation changes for at least a portion of the time the first engaging portion engages the engaged portion.

14. The driving tool according to claim 11, wherein the driver and the lift mechanism are configured such that, when the second axis of rotation has moved away from the first axis of rotation, the plurality of engaging portions of the wheel engages the plurality of engaged portions of the driver.

15. The driving tool according to claim 11, wherein the rotation shaft includes (i) a wheel supporting portion and (ii) a housing portion that houses the biasing member.

* * * * *